United States Patent [19]

Takami et al.

[11] Patent Number: 5,034,769
[45] Date of Patent: Jul. 23, 1991

[54] INTERCHANGEABLE CAMERA AND INTERCHANGEABLE FLASH DEVICE

[75] Inventors: Satoshi Takami; Teruhiko Naruo; Yutaka Ohsawa, all of Tokyo, Japan

[73] Assignee: Asahi Kogaku Kogyo K.K., Tokyo, Japan

[21] Appl. No.: 473,001

[22] Filed: Jan. 31, 1990

Related U.S. Application Data

[63] Continuation of Ser. No. 376,197, Jul. 3, 1989, abandoned, which is a continuation of Ser. No. 130,585, Dec. 9, 1987, abandoned.

[30] Foreign Application Priority Data

| Dec. 9, 1986 | [JP] | Japan | 61-291521 |
| Dec. 19, 1986 | [JP] | Japan | 61-301189 |
| Dec. 19, 1986 | [JP] | Japan | 61-301190 |
| Dec. 27, 1986 | [JP] | Japan | 61-309093 |
| Jan. 9, 1987 | [JP] | Japan | 62-1678 |
| Feb. 4, 1987 | [JP] | Japan | 62-14290[U] |
| Feb. 6, 1987 | [JP] | Japan | 62-15517[U] |
| Feb. 6, 1987 | [JP] | Japan | 62-24477 |

[51] Int. Cl.$^5$ ............................................. G03B 15/05
[52] U.S. Cl. .................................. 354/413; 354/416; 354/145.1
[58] Field of Search ...................... 354/413, 416, 145.1

[56] References Cited

U.S. PATENT DOCUMENTS

| 4,256,393 | 3/1981 | Dietrich et al. | 354/145.1 |
| 4,326,785 | 4/1982 | Tsukamoto et al. | 354/413 |
| 4,573,786 | 3/1986 | Taniguchi et al. | 354/416 |

Primary Examiner—Michael L. Gellner
Attorney, Agent, or Firm—Sughrue, Mion, Zinn, Macpeak & Seas

[57] ABSTRACT

A flash device for a photographing camera comprising an ordinary flash mechanism, an improved flash mechanism including a part of the ordinary flash mechanism, an operation mode controller which selectively switches the operation mode of the flash mechanisms and a control terminal which is provided in addition to terminals electrically connecting the ordinary flash mechanism to the photography camera, the control terminal electrically coupling the operation mode controller to the camera, and with the switching of operation modes of the ordinary flash mechanism and the improved flash mechanism being changed by the operation mode controller in response to an input signal to the control terminal.

37 Claims, 20 Drawing Sheets

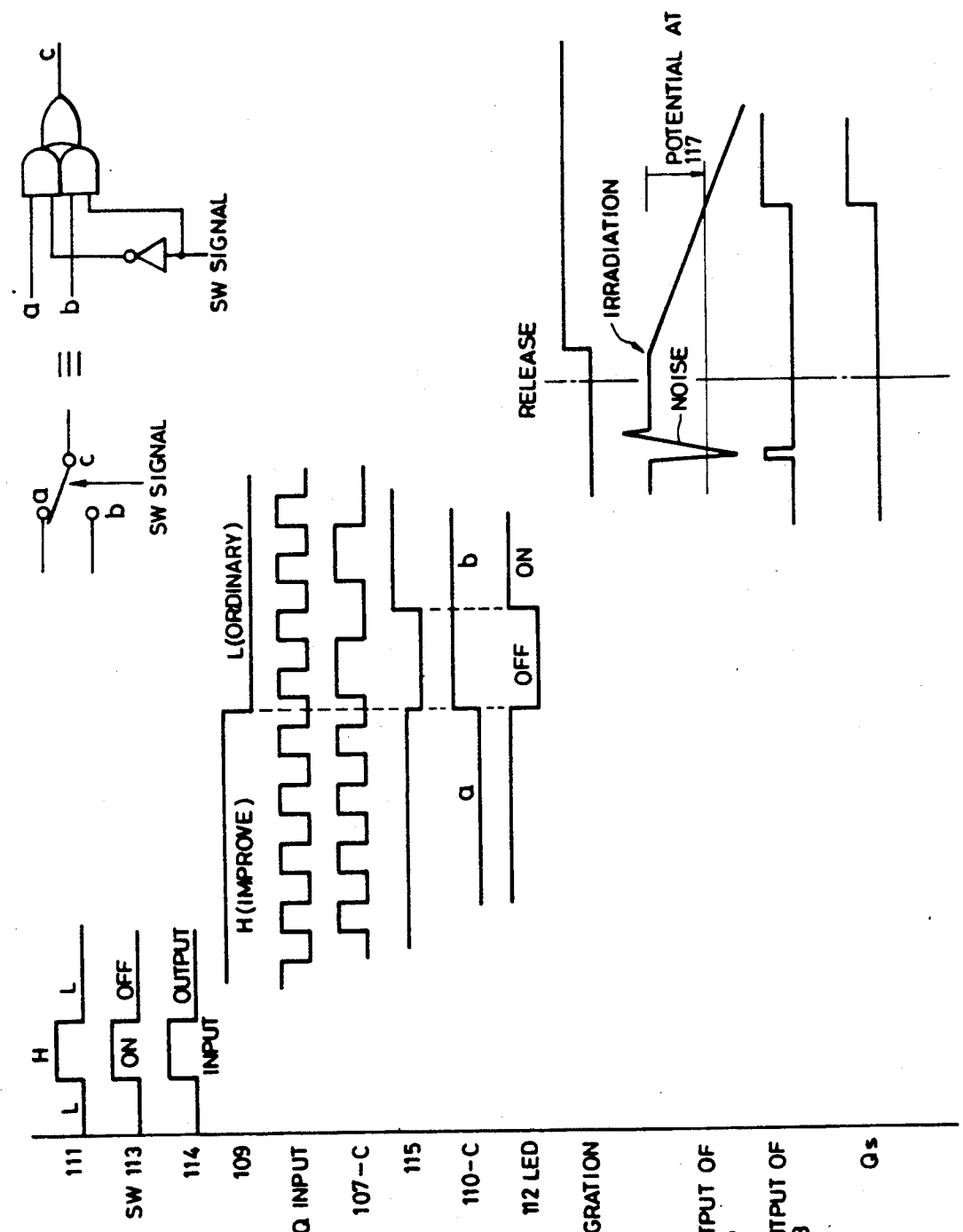

INTERCHANGEABLE CAMERA AND INTERCHANGEABLE FLASH DEVICE

This is a continuation of Application 07/376,197 filed July 2, 1989, which is a continuation of Application No. 07/130,585 filed Dec. 9, 1987 now abandoned.

BACKGROUND OF THE INVENTION

1. FIELD OF THE INVENTION

The present invention relates to a flash device which is interchangeable with both an ordinary type photographing camera and an improved type photographing camera, and relates to the improved camera which is interchangeable with both an ordinary type flash device and the improved flash device.

2. DESCRIPTION OF THE PRIOR ART

Recently, a variety of flash devices and photographing cameras have been proposed in which various data transmissions are carried out between the photographing camera and the flash device.

Since the flash data and camera data have their own signal modes as well as differences in the number of signal series in accordance with the mechanism and the function thereof, a flash device which can be coupled to a camera may be limited. Namely, a flash device which may be coupled to a type of a camera or cameras of a certain camera maker, is inevitably limited as a so-called exclusive flash device.

The exclusive flash device of this type realizes various automatic operations required for flash photography. For example, when the flash device has been fully charged the camera is automatically switched to an operation mode for flash photography by providing a signal which indicates that the flash is ready, or flashing is suspended by inputting a quench signal when adequate exposure is obtained.

The flash device of this type is equipped with a microcomputer as a signal processing circuit of a flash data signal and a camera data signal. The microcomputer operates to output or input various data signals in accordance with programmed data and information.

The microcomputers usually provides the structure for feeding the power from a battery in the flash device, and generally uses a regulator for inputting a battery power voltage to apply an output voltage as a stabilized power source voltage.

Further, a flash device used with a camera having an automatic focusing capability, that is, a so-called autofocus camera, is provided with an auxiliary light source for lighting an object to be photographed in conjunction with focusing of the camera.

The lighting by the auxiliary light source is necessary for obtaining a bright object through a view finder for flash photography and for obtaining a projected image of the object as the object for the focusing in the case where the object is flat or is low in contrast.

An infrared light emitting diode or filament lamp may be used as the auxiliary light source. When such a filament lamp is used, a red color filter is provided at the front face thereof in order to project red color light to the object.

With such a conventional flash device described above, the battery for the flash device serves as a power source for lighting the auxiliary light source. Therefore, the flash device is disadvantageous in that, if it is caused to light during the charging operation, an amount of light projected is lowered resulting in insufficient lighting effect.

In more detail, since a booster circuit consumes a comparatively large amount of electrical power until the level, the voltage, level of the battery drops considerably. Under this condition, if the auxiliary light source is energized during such a charging period, sufficient amount of light cannot be obtained by the auxiliary light source.

The above problem accompanying the conventional flash device using an LED may be significant in a flash device using a filament lamp as an auxiliary light source.

Moreover, when the power supply is simultaneously carried to both the booster circuit and the auxiliary light source, the reduction in the voltage level of the power source is more significant. As a result, it is somewhat difficult to supply constant power to circuit elements such as a micro-computer which are to be driven by the constant voltage source, The conventional flash device and the conventional photographing camera ar disadvantageous in that the flash device and the photographing camera have no compatibility with respect to each other because the combination of the flash device and the camera! which can load the flash device is restricted.

Therefore, upon developement of a new type of camera an exclusive flash device which can be loaded on that camera has to also be developed. In other words, an exclusive flash device must be newly developed for every camera developed.

The exclusive flash device thus developed in line with development of the camera is a very convenient flash device having various automatic functions but the provision of the exclusive flash device results in that, in the case where a user buys an improved type camera it is also necessary for the user to buy such an exclusive flash device to the improved camera. Further, the cost of the exclusive flash device may be relatively high because it must be newly developed.

Furthermore, the conventional flash device is required to deal with various flash data signals and camera data signal.

In a clip-on type flash device, the above various data transmission is carried out between terminals provided to a fitting leg of the flash device and a hot shoe terminal of a camera. On the other hand, in a grip type flash device, the data signal transmission is carried out by connecting a connecting cord to the camera. However, the data transmission by terminals or the connecting cord encounters difficulty such that mechanisms and functions of the flash device and the camera become complicated day after day, as aresult of which the number of signals to be transmitted is increased.

Since several terminals for the above data signal transmission are provided in a narrow space with electrical insulation, increase in the number of terminals is restricted. Accordingly, a plurality of data signals are transmitted through a single terminal. However, the data signals have different transmitting directions between the flash device and the camera and also have different transmission sequences. Therefore, this results in increasing complexity of the transmission circuit structure as the number of data signals increases.

In order to increase an amount of flash light, it has been proposed that a plurality of the flash devices be used simultaneously. In this case, the corresonding connecting terminals of the respective flash devices are used in common and they are then electrically connected with the corresponding terminals of the camera. Therefore, it is necessary to improve a data output circuit of the flash device to accomplish such complicated data communication.

For instance, assuming that one flash device is sufficiently charged and becomes ready for flashing but the other flash device is under charging and has not yet reached flashable condition, a signal indicating the flash-ready condition, which is produced by the one flash device, may flow into the other flash device. As a result, undesired electrical power consumption may occur or erroneous operation may occur. Moreover a problem which causes breakdown of circuit elements may occur.

Such problems occur easily as the number of flash devices to be used for increasing the amount of flash light increase and further the influence thereof becomes more distinctive.

The battery contained in the flash device consumes its power resulting in an occurrence of voltage drop as the number of times of flashing increases and a leakage current increases during a storage period. Further, when an operation of a booster circuit starts. a battery voltage decreases due to power consumption of such a booster circuit. The degree of voltage drop of the battery differs depending on consumption of the power.

Therefore, a conventional flash device is provided with a regulation circuit to adjust the output voltage of the battery to a constant stabilized voltage. However, with such regulation, it may be somewhat difficult to obtain a stabilized voltage with high accuracy. Thus, the regulator circuit is not suitable for a power source having high accurancy for supplying power to a microcomputer and circuits which require an accurate reference voltage.

SUMMARY OF THE INVENTION

In view of the above described difficulties accompanying the conventional devices, it is therefore an object of the present invention to provide a flash device low in power consumption, which has compatibility with both an ordinary photographing camera and a new type (improved) auto-focusing photographing camera and to further provide a ne type camera capable of operating with both a conventional, ordinary flash device and the above improved flash device.

According to the present invention, the above, and other objects are accomplished by the provision of a flash device comprising an ordinary flash mechanism and an improved flash mechanism utilizing a part or entire part of such ordinary mechanism and an operation mode switching means capable of selectively switching operation modes of the flash mechanisms. Furthermore, a control terminal is provided in addition to terminals which electrically connect an ordinary flash mechanism to a photographing camera, so that the operation mode switching means is electrically connected to the camera through such a control terminal. The operation mode switching means operates to put one of the ordinary flash mechanism and the improved flash mechanism in an operation mode in response to the existence of an input signal to the control terminal.

On the other hand, a photographing camera according to the present invention, which has functions responding to improved and ordinary type flash, devices, comprises terminals which electrically contact with terminals of an ordinary type flash device, a control terminal which electrically contacts with one terminal of an improved type flash device having terminals corresponding to the conventional terminals and a discriminating means which identifies a type of a flash device as an ordinary type flash device when a terminal voltage of the control terminal does not change for the loaded flash device or as an improved type flash device when the terminal voltage changes, in which a camera mechanism interlocking with the ordinary type flash device and a camera mechanism interlocking with the improved type flash device are selectively switched to the operation mode in response to an output of the discriminating means.

Further, a flash device according to the present invention comprises a data processing means which applies a flash data signal to a photographing camera and receives a quench signal as a camera data signal from the camera. The processing means operates to control the flash operation so that the flash operation is stopped in response to the quench signal input.

More specifically a control terminal $C_0$ is newly provided in addition to a trigger signal input terminal $X_0$ and terminals $R_0$ and $Q_0$ for dealing with a flash data signal and a camera data signal. What is input to the control terminal $C_0$ is a control signal including the first, second and third pulse signals.

The data processing means operates to switch to a camera data signal input operation in response to the control signal when the first pulse signal is input to the terminal $C_0$ as a control signal or to the flash data signal output operation mode when the second pulse signal is input. When the third pulse signal is input as the control signal, the operation mode is switched to a flashing mode.

In the operation mode of the ordinary flash device, the signal indicating the flash ready condition is output through the terminal $R_0$ and the transmission of the flash data signal and the camera data signal is carried out through the terminal $Q_0$. In the operation mode of the improved type flash, while the terminal $R_0$ receives a serial clock signal, the terminal $Q_0$ receives and outputs the flash data signal including the signal which indicates the flash ready condition and the camera data signal as a serial signal responding to the serial clock signal.

BRIEF DESCRIPTION OF THE DRAWINGS

FIG. 16 is timing charts for description of an operation of the circuit shown in FIG. 15; FIG. 17 is a circuit diagram showing a logic circuit for a change-over switch 110.

DESCRIPTION OF THE PREFERRED EMBODIMENTS

An embodiment of the present invention will be described with reference to the accompanying drawings.

Figure 1:
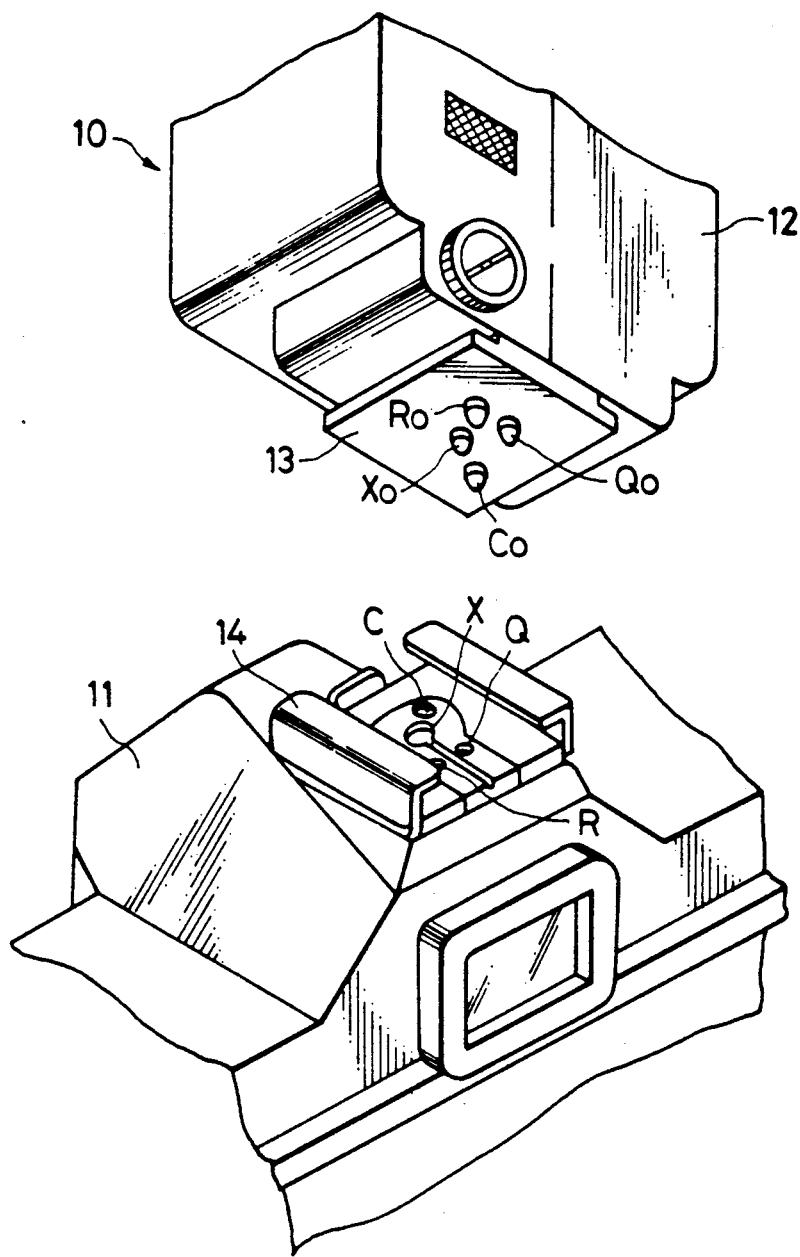
FIG. 1 is a partial perspective view of the clip-on type flash device as the embodiment of the present invention and the camera loading such flash device.

FIG. 1 is a perspective view of a clip-on type flash device 10 and a newly developed (improved) camera 11.

A coupling leg 13 provided to an external bottom part of a case body 12 of the flash device 10 is provided with flash device side terminals $X_0$, $R_0$ and $Q_0$ which are biased to protrude by a spring, and a newly provided terminal $C_0$ which is also biased to protrude in the same way.

A hot shoe 14 of the camera 11 is provided with terminals $X_0$, $R_0$ and $Q_0$, and a further camera side terminal C corresponding to the terminal $C_0$. Therefore, the terminals on the flash device side are placed in contact with respective terminals on the camera side by coupling the coupping leg 13 to the hot shoe 14.

The coupling leg 13 has a five-terminal structure including the four terminals mentioned above and an earth terminal $G_0$ (not illustrated). This earth terminal $G_0$ is placed in contract with an earth terminal G on the camera side. These earth terminals $G_0$, G have a well known structure and a part of the hot shoe 14 is, for example, placed in contact with the earth segment of the coupling leg 13.

The terminals $X_0$, X are provided to transmit a trigger signal therethrough from the camera to the flash device, which is generated in synchronization with a shutter operation. The terminals R, $R_0$ are provided to transmit a serial clock signal from the camera to the flash device 1 but also act as the connecting terminals for transmitting a signal which indicates that the flashing is ready (hereinafter only referred to as a ready signal) from the flash device to an ordinary type camera when the flash device is loaded to the ordinary type camera. The terminals $Q_0$, Q are provided to carry out transmission of various kinds of serial signals such as the ready signal, an aperture data signal and a quench signal between the camera and the flash device. The terminals $C_0$, C are provided to discriminate between the improved type and the ordinary type flash devices. In addition, a control signal is applied from the camera to the flash device when the improved type flash device is coupled.

Figure 2:
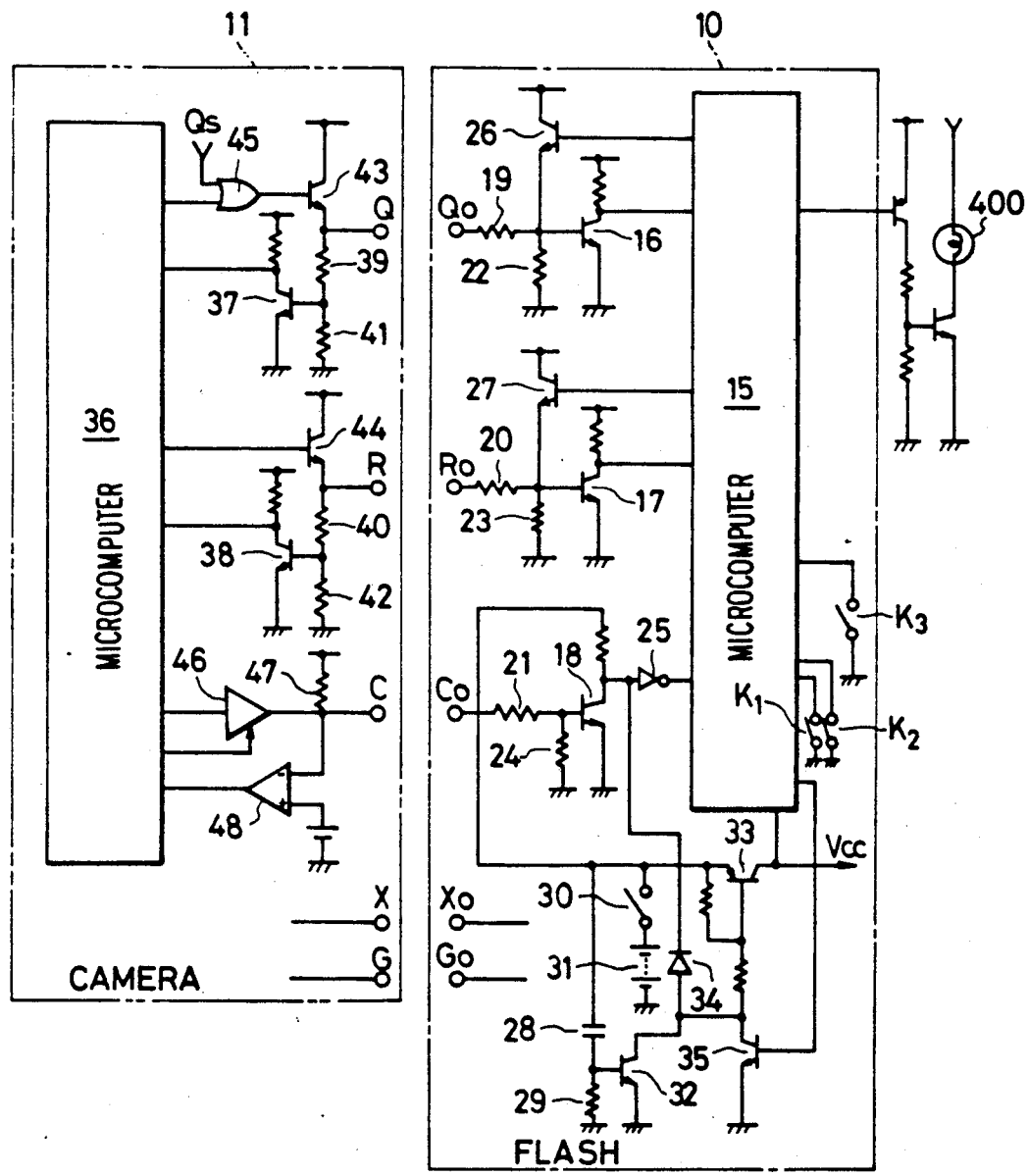
FIG. 2 is a circuit diagram of the input/output circuit of the flash device connecting terminals of the fitting leg and the input/output circuit of camera connecting the terminals of the hot shoe.

FIG. 2 is a circuit diagram showing an input/output circuit of the flash device 10 connected to the terminals $R_0$, $Q_0$ and $C_0$ and an input/output circuit of the camera 11 connected to the terminals R, Q and C. In this figure, the partial circuit of the flash device 10 is indicated by a dot-dash line, whereas the partial circuit of the camera 11 is indicated by a double-dot-dash line.

As shown in FIG. 2, the flash device 10 is provided with grounded emitter type transistors 16, 17 and 18, output parts of which are connected to a microcomputer 15. The terminal $Q_0$ is connected to the base of transistor 16 through a resistor 19, while the terminal $R_0$ is connected to the base of transistor 17 through a resistor 20 and the terminal $C_0$ is connected to the base of transistor 18 through a resistor 21. Of the bias resistors 22, 23, 24 of these transistors 16, 17, 18, the bias resistor 24 of transistor 18 has a resistance value (for example, about 20 k ohms) smaller than those of the others. This resistor 24 forms a combined resistor with the resistor 21 and acts, on the flash device side as a discrimination resistor which discriminates whether the flash device 10 is coupled to an ordinary type camera or an improved type camera. The output of the transistor 18 is invented by an inverter 25 to be applied to the microcomputer 15. That is, when the transistor 18 is turned-on, a high level voltage signal is input to the microcomputer 15, and when turned-off, a low level voltage signal is input thereto.

The grounded emitter type transistors 16, 17 and 18 constitute a signal input path for inputting the camera data to the flash device 10.

In addition, two transistors 26 and 27 which receive input signals at the bases thereof from the microcomputer 15 are provided. The emitter of the transistor 26 is connected to the base of transistor 16, while the emitter of the transistor 27 is connected to the base of transistor 17. These transistors 26 and 27 constitute, as emitter followers, a signal output path to the camera through the terminals $R_0$ and $Q_0$.

A series circuit of a capacitor 28 and a resistor 29 form a time constant circuit to which the power is applied by a battery 31 when the power supply switch 30 is turned on. A grounded emitter type transistor 32, whose base is connected to the time constant circuit, is turned-on for a short period defined by such a circuit.

The time constant circuit and transistor 32 turns on a power transistor 33 when the transistor 32 turns ON, to stabilize the flash device circuit in an initial operating condition. The collector of the transistor 32 is connected to the collector of the transistor 18 through a diode 34 and is connected to the transistor 35 which is connected in parallel to the transistor 32 and which receives an input at its base from the microcomputer 15.

When the transistor 18 is turned-on upon the input of a control signal to the terminal $C_0$, the power transistor 33 is turned-on to maintain power holding condition. Namely, when the transistor 18 is turned-on, a high level voltage signal is input to the microcomputer 15 from the inverter 25. As a result, the microcomputer 15 controls the transistor 35 to be turned-on for a predetermined period of time and then the power transistor 33 continues power supply to the flash device circuit for a predetermined period of about 5 to 50 minutes for example, regardless of the successive ON or OFF states of the transistor 18.

Meanwhile, the flash device 10 includes an ordinary flash mechanism and an improved flash mechanism utilizing a part or entire part of the ordinary flash mechanism and the operation modes of this pair of flash mechanisms are selectively switched by the microcomputer 15.

In FIG. 2, reference numeral 400 designates an auxiliary light source desribed later in detail, and reference characters $K_1$ and $K_2$ designate switches for producing a two bit data signal representing guide-number data, irradiation angle data and the like. Per example, the switch $K_1$ and $K_2$ may be mechanical switches such as code-plate type switches provided to the flash device.

A flash device having the above described ordinary flash mechanism has been commercially available and an example of the flash device is proposed in Published Unexamined Japanese Patent Application No. 204029/1982.

The ordinary flash mechanism has a terminal structure same as the 4-terminal structure of terminals $X_0$, $R_0$, $Q_0$, $G_0$ having no terminal $C_0$. In this flash mechanism, the ready signal and the aperture data signal are output from the terminal $R_0$ and the terminal $Q_0$, respectively, prior to the start of flashing. The flash device receives the light adjusting signal (the quench signal) as the camera signal from the terminal $Q_0$ after start of flashing.

The improved flash mechanism is provided with the terminal $C_0$ as a control terminal to which a signal is applied. In response to the control signal, various signals required for the improved type camera and improved flash mechanism, such as the ready signal, aperture data signal, quench signal and the like (hereinafter these signals are referred to the serial signals) and are input or output through the terminal $Q_0$ The serial clock signal is input through the terminal $R_0$.

As shown in FIG. 2, the camera 11 is provided with grounded emitter type transistors 37 and 38, the output parts of which are connected to the microcomputer 36. The terminal Q is connected to the base of the transistor 37 through a base resistor 39, while the terminal R is connected to the base of transistor 38 through a base resistor 40. These transistors 37 and 38 constitute a signal path to input the flash data to the camera. Reference numerals 41 and 42 designate bias resistors of transistors 37 and 38.

Transistors 43 and 44 which receive input at the bases thereof from the microcomputer 36 have emitters connected to the terminal Q and the terminal R, respectively. These transistors 43 and 44 form, as the emitter followers, a signal output path which outputs the camera data to the flash device through the terminals R, Q.

The transistor 43 receives an input at the base through an OR gate 45 in order to output the serial signal output from the microcomputer 36 and the quench signal $Q_s$ through the terminal Q as a common terminal.

A drive circuit 46 which outputs the control signal in accordance with an instruction signal of the microcomputer 36 is provided, and an output end of the drive circuit 46 is connected to the terminal C. The drive circuit 46 has a tristate output and a resistor 47 connected to the output of the circuit 46 is a discrimination resistor which is provided to discriminate, at the camera side, whether the ordinary type flash device or the improved type flash device is used. The resistor 47 has a comparatively hi9h resistance value (for example, about 200 k ohms). When the terminals C and $C_0$ are connected to each other by the coupling of the improved type flash device 10, an output voltage of drive circuit 46 appearing at the terminal C drops to a divided voltage determined by the discrimination resistor 47 on the camera side, and the resistor 21 and discrimination resistor 24 on the flash device side, to thereby lower the voltage at the terminal C. It should be noted that a combined resistance value of the resistor 21 and the discrimination resistor 24 is set smaller than the resistance value of the discrimination resistor 47.

The low level voltage of terminal C is detected by a comparator 48. This comparator 48 is formed by an operational amplifier having a non-inversion input terminal to which a constant reference voltage is applied. The low level voltage is applied to an inversion terminal. The comparator 48 operates to apply a high level voltage to the microcomputer 36, so that the camera 11 is put in an operation condition for the improved type flash device.

In response to the high level voltage signal, the drive circuit 46 is controlled to increase an output voltage at the terminal C to thereby change a voltage of terminal C to a high level from a low level.

In the case where the ordinary type flash device having no terminal $C_0$ is coupled, the high level at the terminal C is maintained unchanged, and the low level voltage of the comparator 48 is input to the microcomputer 36 so that the camera 11 operates responding in a manner appropriate for the ordinary type flash device.

In response to the output of the discrimination unit including the drive circuit 46, the discrimination resistance 47 and the comparator 48, either the camera mechanism interlocking with the ordinary type flash device or that interlocking with the improved flash device is selectively transferred to the operation mode.

The remaining circuit structures connected to the terminals X, $X_0$, and terminals G, $G_0$ are the same as those of the conventional flash device or the conventional camera and therefore description therefor is intentionally omitted.

Figure 15:
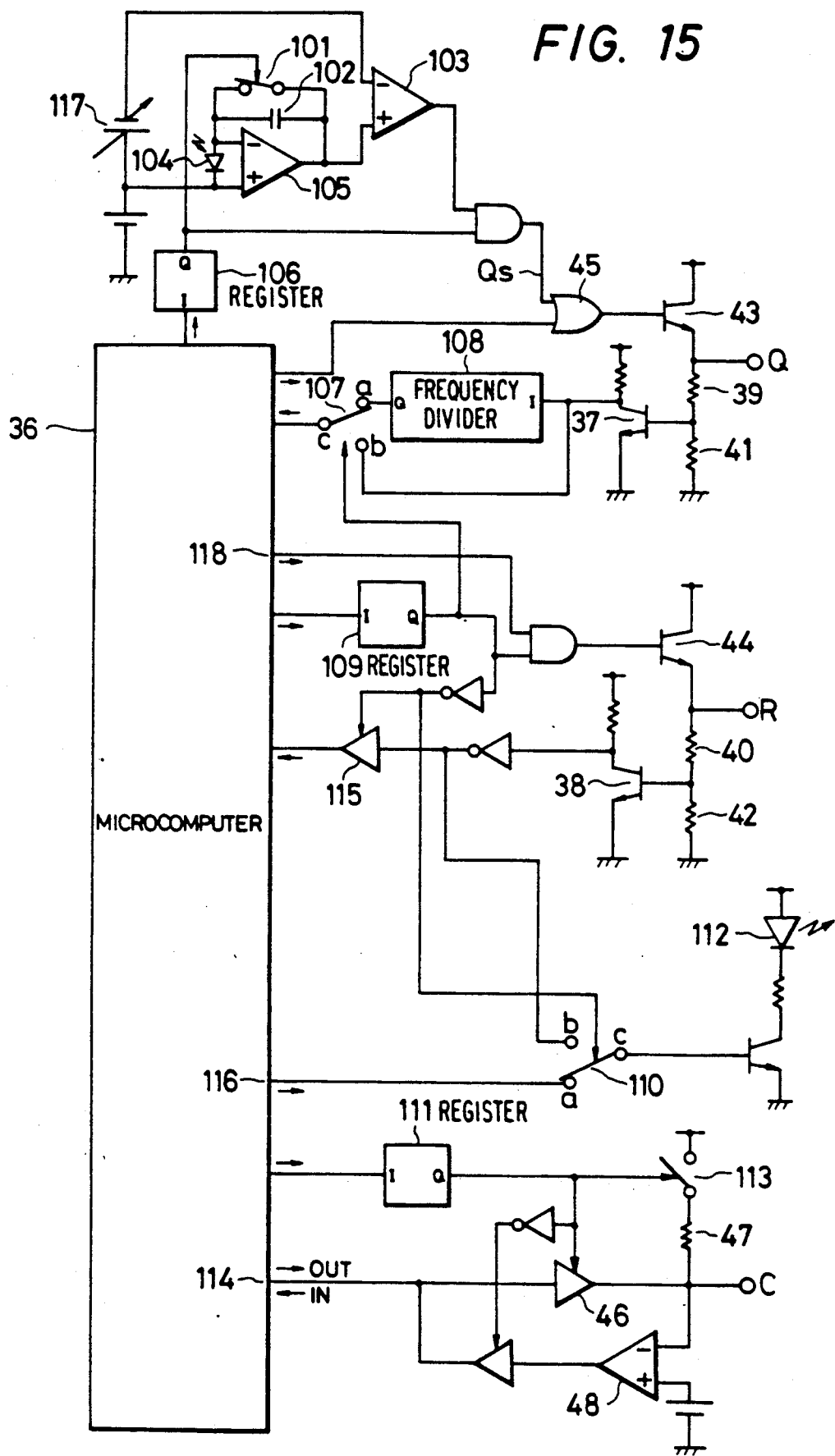
FIG. 15 is a circuit diagram showing an input/output control circuit with a microcomputer in a camera body.
Figure 18:
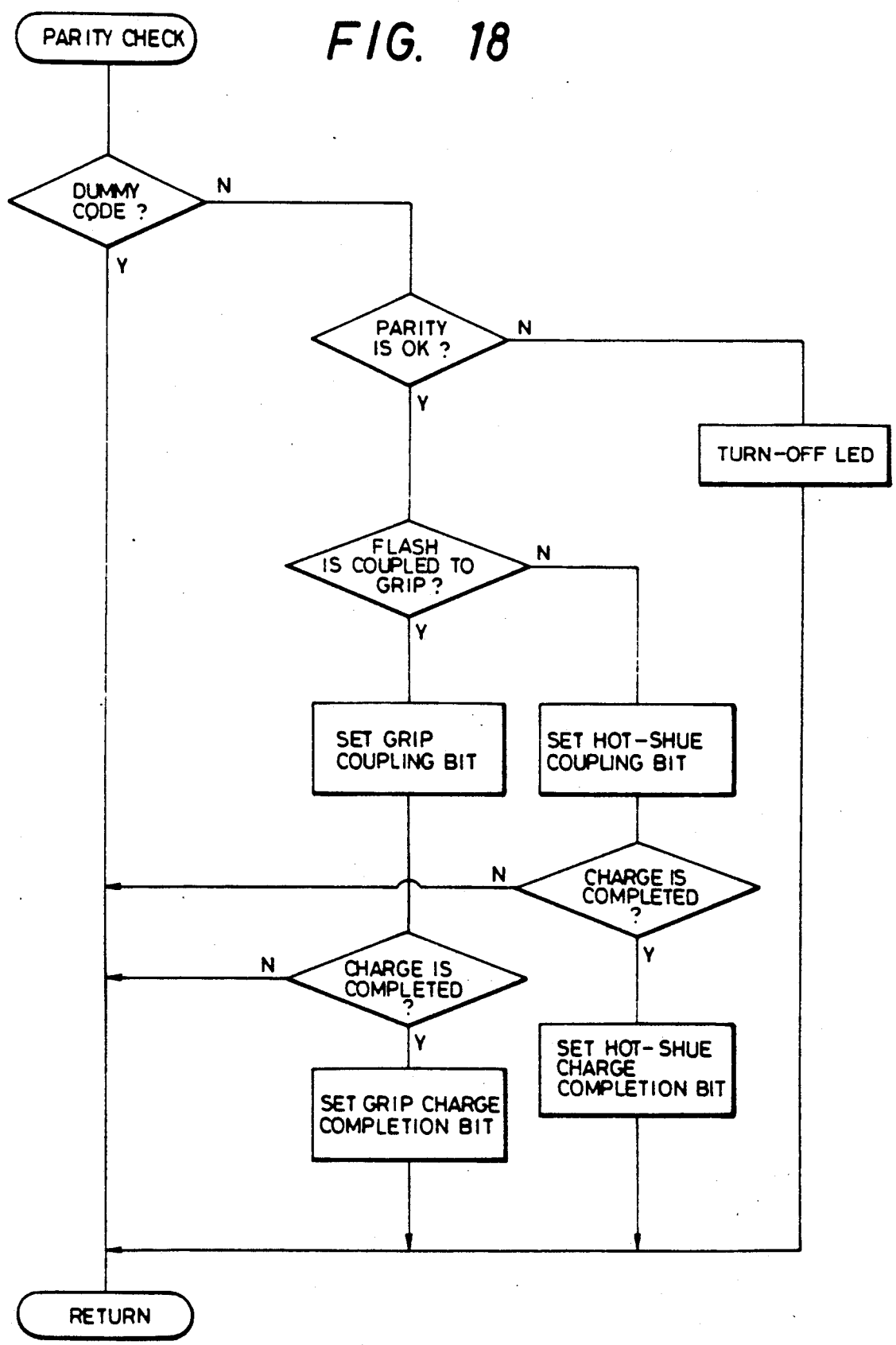
FIG. 18 is a flow chart of parity check operation.

FIG. 15 is a circuit diagram showing an input/output control circuit with the microcomputer 36 in the camera body 11 in detail. The circuit shown in FIG. 15 is provided with a circuit for producing the quench signal Qs and a circuit for producing a charge completion signal to turn-on an LED. FIGS. 16(a) through 16(m) are timing charts for description of an operation of the circuit shown in FIG. 15, and FIG. 17 is a circuit diagram showing a logic circuit for a change-over switch 110.

An operation of the circuit shown in FIG. 15 will be described with reference to FIGS. 16(a) to 16(m).

For moniteing the condition of a signal appearing at the terminal C to detect the type of a flash device coupled to the camera body, a monitor register 111 is set to a high level as shown in FIG. 16(a) and a semiconductor switch 113 is turned-on in response to the high level signal from the register 111 as shown in FIG. 16(b). In this case, an input/output termimal 114 of the microcomputer 36 is put in condition for receiving an input signal as shown in FIG. 16(c). In other words, the signal at the terminal C is allowed to be input to the microcomputer 36 through the terminal 114. Due to the provision of the switch 113, it is possible to neglect an impedance viewed from the flash device when the movable contac of the switch 113 is shifted to another stationary contact.

As a result of the monitoring, when it is detected that an improved flash device is coupled to the camera body, a register 109 is set at a high level. On the other hand, when it is detected that an ordinary flash device is coupled to the camera body, the register 109 is set to a low level as shown in FIG. 16(d).

In case of the high level signal being produced from the register 109, a clock signal from terminal 118 is allowed to pass through an AND gate and the terminal R, and a tristate buffer 115 is put in an output high impedance state. A change-over switch 110 is put in such a condition as shown in FIG. 15, so that a circuit between contacts a and c is formed (See FIG. 17(h)). If an output from an LED control terminal 116 is at a high level, an LED 112 is turned-on to indicate charge completion in a view finder (See FIG. 16(i)). A movable contact of a change-over switch 107 has been shifted from a stationary contact a to a stationary contact b to thereby allow an input signal from the terminal Q to be applied to the microcomputer 36, thereby informing the microcomputer 36 of the flash ready state of the flash unit, in response to which line 116 from the microcomputer is raised to a high level.

In case of the low level signal being produced from the register 109 as shown in FIG. 16(d), an output from the terminal 118 is blocked by the AND gate, and no output is produced from terminal R. In response to the high level signal, a tristate amplifier 115 is put in the ON state to allow an input signal applied to the terminal R to pass therethrough. Further, a movable contact of the switch 110 is shifted to a terminal b thereof as shown in FIG. 16(h), and thus the LED 112 is turned-on and off intermittently in response to the signal applied to the terminal R. A pulse signal representing an external light F value of the ordinary flash device, which is applied to the terminal Q is subjected to frequency-division in a frequency divider 108. Since the switch 107 is continuously put in the position shown in FIG. 15, the output of the frequency divider 108 is allowed to pass through the switch 107. The reason why the signal is subjected to the frequency division, is to decrease the input speed so as to meet the processing speed of the microcomputer 36.

An integration operation is stored in response to the setting of high level in an integration start register 106 (See FIG. 16(j)). With such construction as shown in FIG. 15, even if undesired noise occurs in an output of an operational amplifier 105 as shown in FIG. 16(k), an erroreous quench signal is prevented from being produced through the terminal Q. Then, upon setting the register 106 to the high level, the switch 101 is turned-off and a capacitor 102 is thus charged by an optical current from a light receiving element 104. Further, an output cf a comparator 103 is allowed to pass through an AND gate, because the high level output is applied from the register 106 to on input terminal of the AND gate.

The operation of the flash device 10 and the camera 11 will be then described hereunder in detail.

(1) In case of an improved type flash device being coupled to an improved type camera:

Operation will be described with reference to the time chart shown in FIG. 4. In this combination, the terminals $X_0$, $R_0$, $Q_0$, $C_0$, $G_0$ of flash device are connected to the terminals X, R, Q, C, G on the camera side respectively.

When the power supply switch 30 of the flash device is turned-on, as already explained above, the power transistor 33 is turned-on for short period of time and the flash device circuit is set to the initial operating condition.

Under the aforementioned condition, when the power switch (not shown) of the camera 11 is turned on, the drive circuit 46 outputs the control signal.

Figure 3:
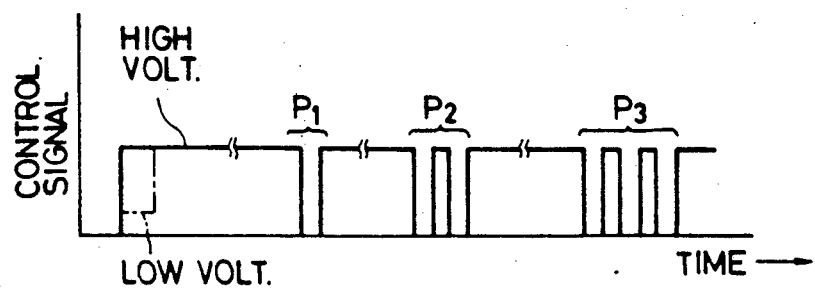
FIG. 3 is a time chart of control signal to be input to the control terminal of the flash device.

The control signal is of a voltage signal having a predetermined level to output pulse signals $P_1$, $P_2$ and $P_3$ shown in FIG. 3 and FIG. 4(a).

When the control signal is generated, an output voltage of the drive circuit 46 is divided by the discrimination resistors 24 and 47 and the resistor 21 as a result of which a low voltage as indicated by a dashed line in FIG. 3 appears at the terminals C and $C_0$.

This low voltage is applied to the inversion input terminal of the comparator 48 and the high voltage output produced by the comparator 48 is applied to the microcomputer 36.

According to the operations described above, it is determined on the camera side that the improved type flash device 10 is coupled to the camera and the camera 11 operates accordingly.

When the, camera 11 discriminates as described above, the voltage of terminals $C_0$ and C increases to a high level by the function of the drive circuit 46.

On the other hand, in the flash device, the voltage of terminal $C_0$ changes to a high level from a low level, resulting in turning on the transistor 18. Then, the power transistor 33 is turned-on and a high voltage output of the inverter 25 is input to the microcomputer 15. After that, the transistor 35 is turned-on in accordance with the program of microcomputer 15 and the power transistor 33 is continuously turned on for the predetermined period, five to ten minutes for instance. Namely, as indicated in FIG. 4(b), the power source circuit of the flash device circuit is put in power supply condition for a certain period of time to thereby set to the power holding condition.

As a result, power supply operation for the flash device automatically starts immediately before the flash photographing,and then is automatically stopped after the predetermined period. Therefore, undesired electrical power consumption can be minimized.

In addition, since the start of the power supply and the stop thereof are automatically carried out as described above, it is no longer necessary to turn-on the power switch and to restore the switch for every flash photography. Consequently, the flash photography can be further simplified.

The power supply circuit according to the present invention is available for the entire circuit included in the flash device. Further, the present power supply circuit may be available for a part of the circuits included in the flash device, such as a flash data generating circuit, a responding circuit for responding to the camera data signal and the like.

The microcomputer 15 also discriminates that the flash device 10 is coupled to the improved type camera 11 when an output of the inverter 25 is set to the high level during a predetermined period of time (about 10 ms for instance).

In other words, in case of a voltage appearing at the terminal $C_0$ being of the high level during a period of t, owing to the timer function of the microcomputer 15, it is determined that the improved flash device 10 is loaded to the improved type camera 11 and the improved flash mechanism is put in an operation mode.

Figure 5:
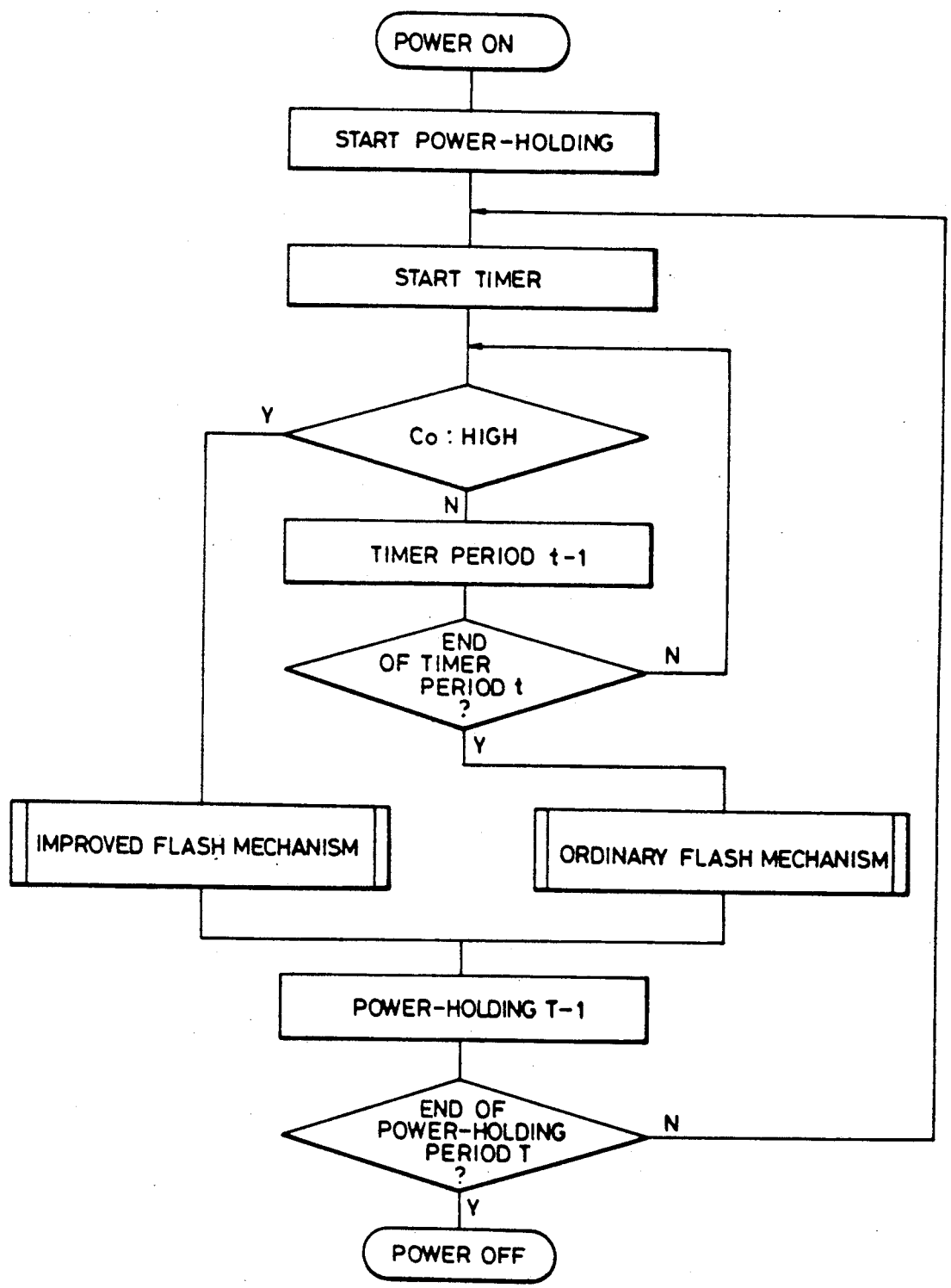
FIG. 5 is a flowchart of microcomputer which indicates the power holding and discriminating operations of the flash device and is provided to such a flash device.

FIG. 5 is a flow chart of the microcomputer 15 indicating the power holding and discriminating operations. As shown in the figure, the microcomputer 15 controls the flash device 10 to be turned-on almost simultaneously with the input of control signal to the terminal $C_0$. Thereafter, it causes the flash device to keep the power holding condition and then causes the program to run in order to start the timer.

It is then discriminated whether the voltage of terminal $C_0$ is a high level or not. In case of a low level, the timer period t is decremented by one (−1) and the discrimination processing is then repeated.

The discriminating operation is repeated until the timer period t becomes zero. When the high level voltage is confirmed, the improved flash mechanism is put in an operation mode. In case of no high level, the ordinary flash mechanism is set in an operation mode.

The power supply to the flash device 10 continues until the end of a predetermined power holding period T and when this power holding time T terminates, the power supply of the flash device 10 is automatically stopped.

After the above discriminating operation terminates, the pulse signals $P_1$ and $P_2$ shown in FIG. 3 and FIG. 4(a) are repeatedly applied to the terminal $C_0$ from the drive circuit 46.

When the pulse signal $P_1$ is applied to the terminal $C_0$, the transistor 18 is once turned-off and the low output of inverter 25 is then applied to the microcomputer 15. From this timing, the microcomputer 15 start the operation to receive the camera data from the camera 11. Accordingly, the serial clock signal is input to the terminal $R_0$, the serial signal to the terminal $Q_0$ and these camera data are transmitted to the microcomputer 15 through the transistors 16 and 17 (See FIG. 4(c), (d)).

Figure 26:
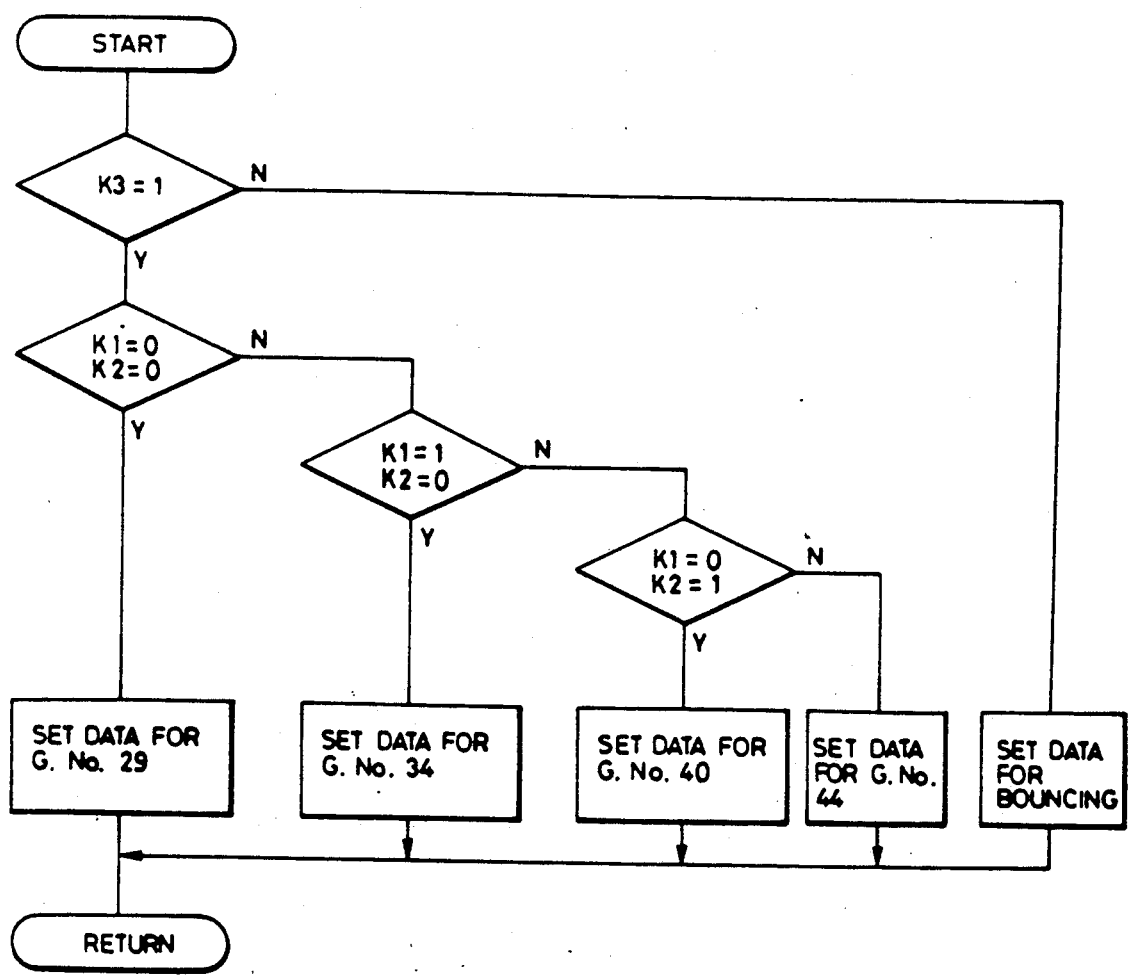
FIG. 26 is a flow chart for guide-number setting operation.

When the pulse signal $P_2$ is input from the terminal $C_0$, the transistor 18 is repeatedly turned on and turned off and the "low", "high" and "low" outputs of the inverter 25 are input to the microcomputer 15. Consequently, the microcomputer 15 then transmits the flash data to the camera 11 by switching on transistor 26. More particularly, the microcomputer 15, contrary to the operation explained earlier, receives the serial clock signal from the terminal $R_0$ and then outputs the serial signal such as the ready signal and aperture value data signal from the terminal $Q_0$ as the emitter follower output of transistor 26. In addition to the above serial signal, data representing a guide number and irradiation angle of the flash device and data representing bouncing flash mode may be applied as a serial signal through the terminal $Q_0$ to the microcomputer 36. The data signals are produced by the switches $K_1$ to $K_3$ shown in FIG. 2. Assuming that the switches are turned-on to produce output signals of "1", a guide-number setting operation is as shown in FIG. 26. In FIG. 26, "$K_3 = 1$" represents that the flash device is set to bouncing operation. The guide-number data is set according to the on-off operation of the switches $K_1$ and $K_2$. These data have been set in the microcomputer 15. It should be noted that an amount of light which irradiates an object to be photographed during the bouncing operation of the flash device is much smaller than that of a normal flash photography. Therefore, when the flash device is set to the bouncing mode and the data representing the bouncing mode is applied, the transmission of data as to the guide number is suspended. Moreover, it transmits these flash data to the microcomputer 36 through the transistor 37 ON the side of camera (refer to FIGS. 4(c), (e).

The microcomputer 36 of the camera 11 is so programmed that it discriminates that the improved type flash device 10 is loaded when the high level voltage output of comparator 48 is input. Thereafter, it causes the drive circuit 46 to output the pulse signal $P_1$ and $P_2$. Immediatly after the output of the pulse signal $P_1$, the serial clock signal is output through the transistor 44 to the terminal R and the serial signal to the terminal Q through the transistor 43. Immediately after the output of the pulse signal $P_2$, the serial clock signal is is received at the terminal R through the transistor 44 and to output th serial signal to the terminal Q through the transistor 37.

Figure 14:
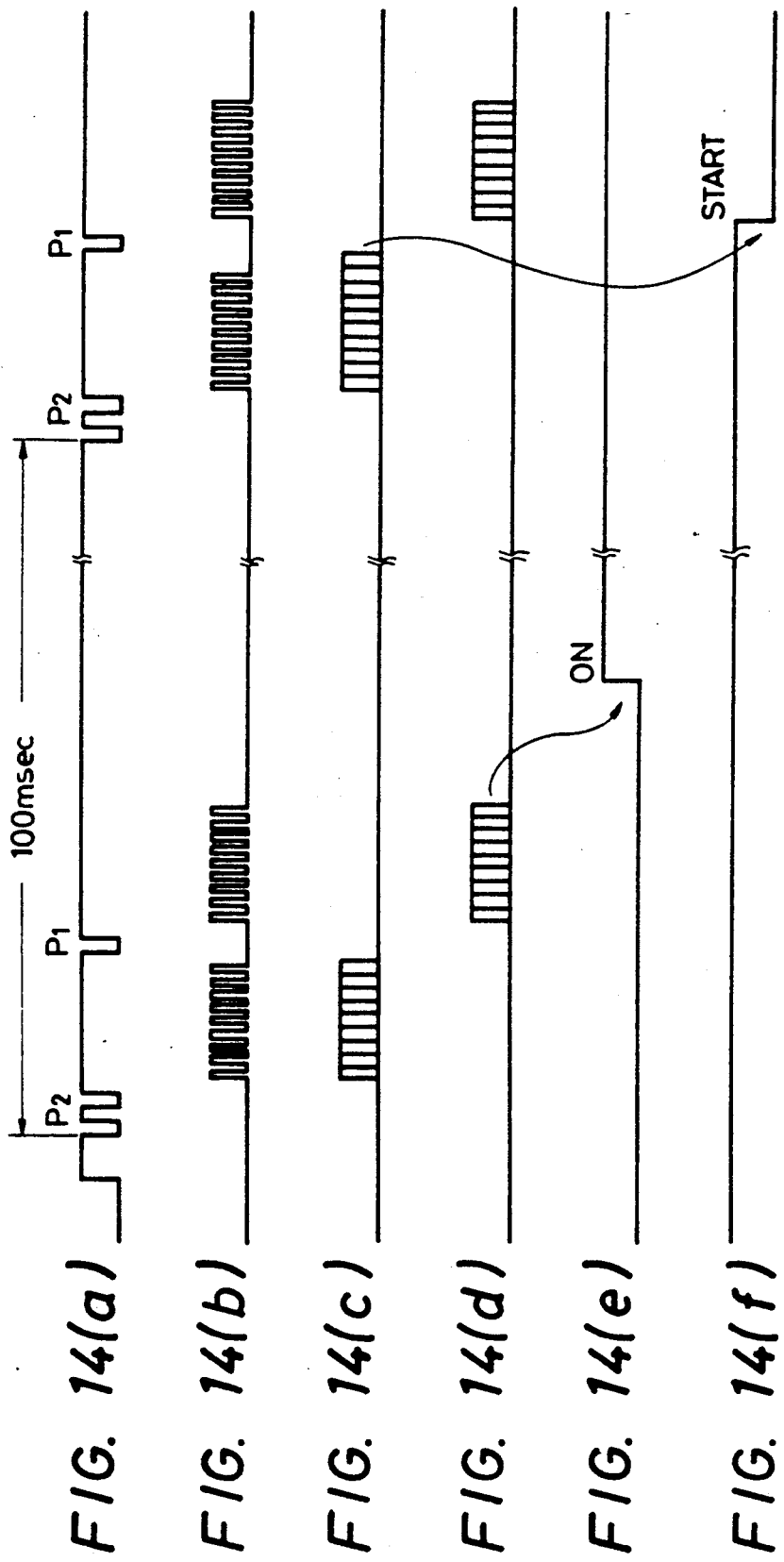
FIG. 14 is a timing chart for description of the device of the present inveniton.

The data transmission between the flash device and the camera body is repeatedly carried out in response to the pulse signals $P_1$ and $P_2$. Although FIG. 4 shows the case where the order of the pulse signals is $P_1$ and $P_2$, as shown in FIG. 14(a), modification where the order of pulse signals are reversed is possible. That is, in response to the pulse signal $P_2$, the data transmission from the flash device to the camera may be first carried out.

The following table shows the timing of data transmission from the flash device to the camera and vice versa under the condition that an operation for charging has started.

In the table, reference numerals 1 to 11 designate the order of data transmission: Data transmission is carried out from the microcomputer 15 in the flash device 10 to the microcomputer 36 in the camera 11 in steps (1), (5) and (9); Data transmission is carried out from the microcomputer 36 to the microcomputer 15 in the flash device 10 in steps (2), (6) and (10); and Data transmission is carried out from the microcomputer 36 to a CPU in the camera 11 in steps (3), (7) and (11). The CPU is provided to control the whole system in the camera.

Data (A) represents the trigger order of plural flash devices attached to the camera;
Data (B) represents a guide-number of a flash device attached to the camera;
Data (C) represents the necessity of an auxiliary light source;
Data (D) represents the condition of the auxiliary light source;
Data (E) represents a set signal;
Data (F) represents a charge completion signal;
Data (G) represents the condition of a rear curtain;
Data (H) represents the condition of a viewing angle;
Data (I) represents whether an auxiliary light source is ready or not;
Data (J) represents a flash mode;
Data (K) represents whether the auxiliary light source is turned-on or off;
Data (L) represents a camera mode;
Data (M) represents the necessity of seqential flash use of the flash devices;
Data (N) represents flash operation in response to the movement of a rear curtain;
Data (O) represents ISO sensitity;
Data (P) represents focal distance of a photographing lens;
Data (Q) represents an F-value of the lens;
Data (R) represents the condition whether the flash device is attached to a hot shue or a grip.

TABLE

| DATA | FLASH TO CAMERA | | | | | | | | CAMERA TO FLASH | | | | | | | | | |
|---|---|---|---|---|---|---|---|---|---|---|---|---|---|---|---|---|---|---|
| | A | B | C | D | E | F | G | H | I | J | K | L | M | N | O | P | Q | R |
| 1 | ○ | ○ | ○ | X | X | X | X | X | | | | | | | | | | |
| 2 | | | | | | | | | X | X | X | DUMMY | X | X | X | X | X | ○ |
| 3 | ○ | ○ | ○ | X | X | X | X | X | | | | | | | | | | |
| 4 | | | | | | | | | X | X | ○ | ○ | X | X | ○ | ○ | ○ | ○ |
| 5 | ○ | ○ | ○ | X | ○ | ○ | ○ | X | | | | | | | | | | |
| 6 | | | | | | | | | ○ | X | ○ | ○ | ○ | ○ | ○ | ○ | ○ | ○ |
| 7 | ○ | ○ | ○ | X | ○ | ○ | ○ | X | | | | | | | | | | |
| 8 | | | | | | | | | ○ | ○ | ○ | ○ | ○ | ○ | ○ | ○ | ○ | ○ |
| 9 | ○ | ○ | ○ | ○ | ○ | ○ | ○ | ○ | | | | | | | | | | |
| 10 | | | | | | | | | ○ | ○ | ○ | ○ | ○ | ○ | ○ | ○ | ○ | ○ |
| 11 | ○ | ○ | ○ | ○ | ○ | ○ | ○ | ○ | | | | | | | | | | |

The data transmission in the above TABLE starts under the condition that the flash device has been fully charged. Accordingly, although it is possible to transmit data representing the completion of charging in the first step (1), since it has been not confirmed whether the flash device is connected to a hot shoe or a flash controller, the data representing the charge completion is transmitted in the step (5) after the Data R being received in the step (2).

In the above case, the data (A) is produced by a flash controller provided between the camera and the flash device. Further, in the step (2), the data (K) representing a dummy code is transmitted to the flash device to set the flash in a predetermined mode.

The data transmission between the flash device and the camera is repeatedly carried out in response to the pulse signals $P_1$ and $P_2$. When the camera 11 is transferred to the release mode during such repetition, a pulse signal $P_3$, as shown in FIG. 3 and FIG. 4, is transmitted to the terminal $C_0$ from the drive circuit 46. Accordingly, an output of the inverter 25 corresponding to the pulse signal $P_3$ is input to the microcomputer 15 and then the computer 15 operates to put a flash stop control circuit in a stand-by condition.

Figure 7:
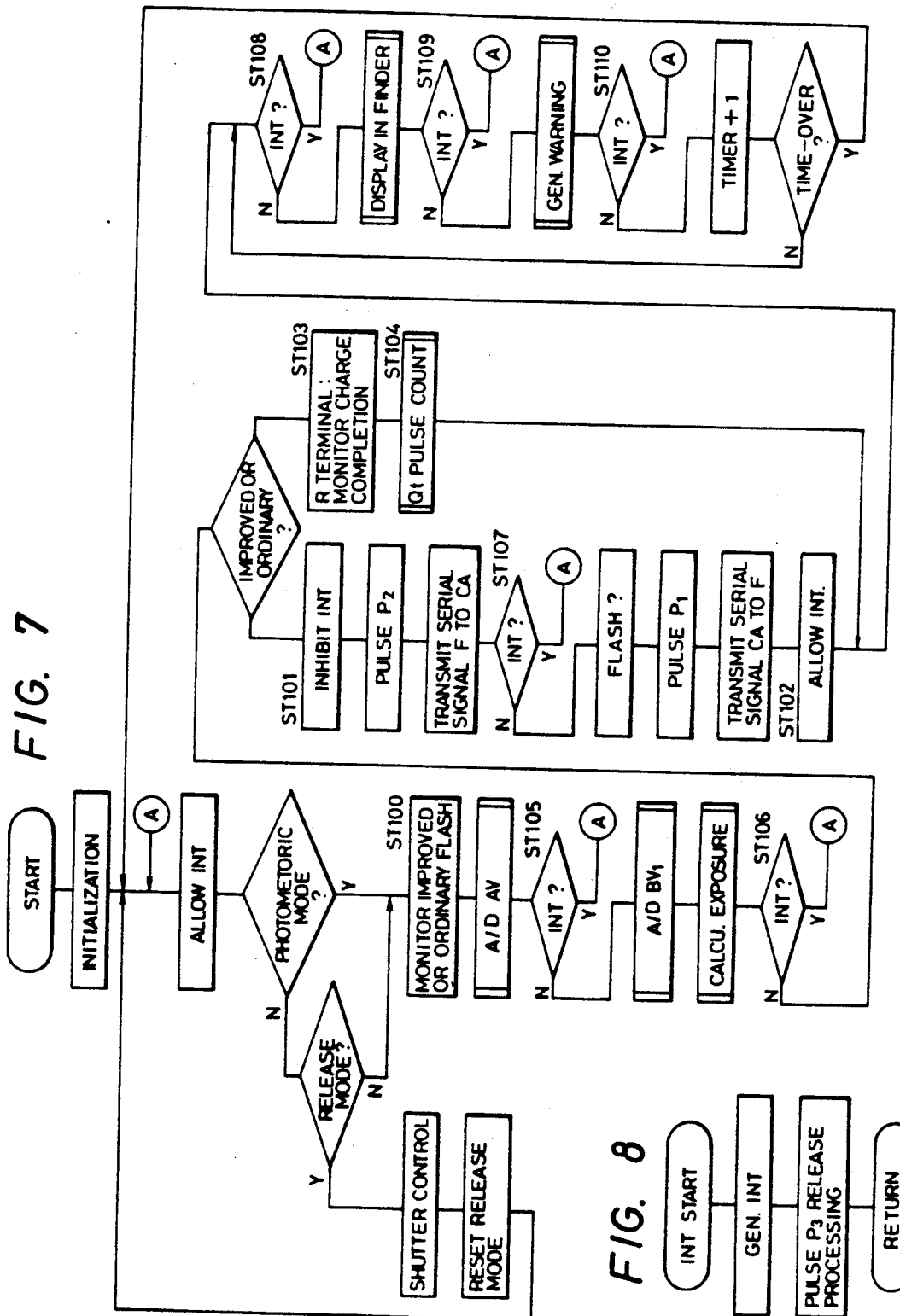
FIG. 7 is a flowchart of microcomputer provided to the camera.

Switching to the release mode of the camera 11 is carried out by issuing an interruption processing signal to the program of the microcomputer 36 (FIG. 7).

When the shutter is released, the trigger signal is input to the terminal $X_0$ to start the flashing, and the flash stop control circuit is activated to receive the quench signal applied from the camera 11. When adequate exposure is obtained, the flash is controlled to stop the flashing in response to the quench signal. (refer to FIGS. 4(d), (f), (g)).

The flash light waveform shown in FIG. 4(g) is represented by a voltage appearing across the load resistor coupled to the light receiving elements.

Figure 6:
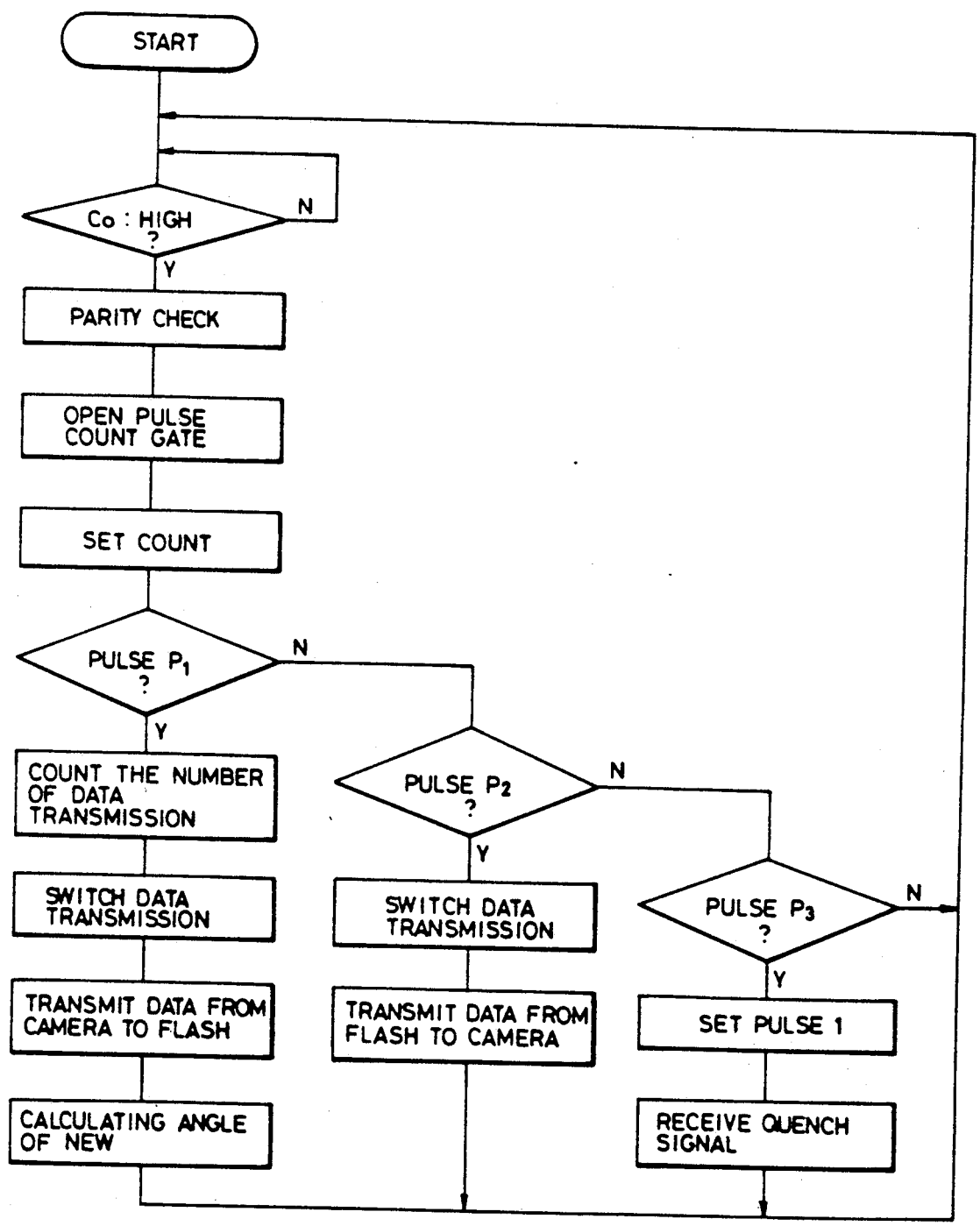
FIG. 6 is a flowchart indicating operations of microcomputer provided to the flash device in case the control signal is input to such flash device.

FIG. 6 is a flowchart indicating the operation of microcomputer 15 when the control signals $P_1$, $P_2$, $P_3$ are input to the flash device 10. As shown in FIG. 6, when a voltage of terminal $C_0$ becomes a high level, the input gate of a counter is opened, parity check is carried out and the the pulse signals $P_1$, $P_2$, $P_3$ are counted by the counter and these pulses are at once set.

It is determined which pulse signal among $P_1$, $P_2$ and $P_3$ is set. When the pulse signal $P_1$ is set, data transfer is switched and the data transmission mode of the flash device is shifted to receive the camera data.

When the pulse signal $P_2$ is set, the data transmission mode is shifted to output the flash device data. Upon the pulse signal $P_3$ being set, the operation mode is to be shifted to a flashing mode. Thus, in the following step, the operation mode is shifted to the flashing mode where the flashing is started and stopped and the quench signal generating circuit is controlled so that the pulse of "1" is set in the flash device to receive the quench signal therefrom. If no $P_1$, $P_2$ and $P_3$ signals are confirmed, the operation step is returned to the initial stage and the discrimination routine is repeated.

Figure 19:
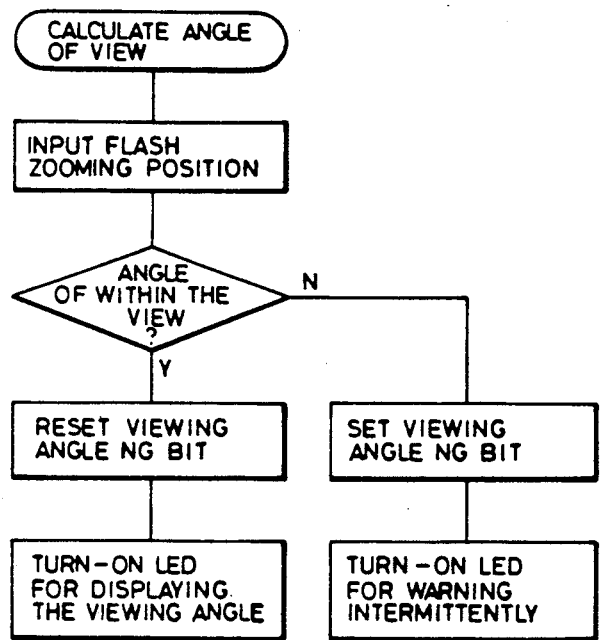
FIG. 19 is a flow chart of a calculation of an angle of view.
Figure 20:
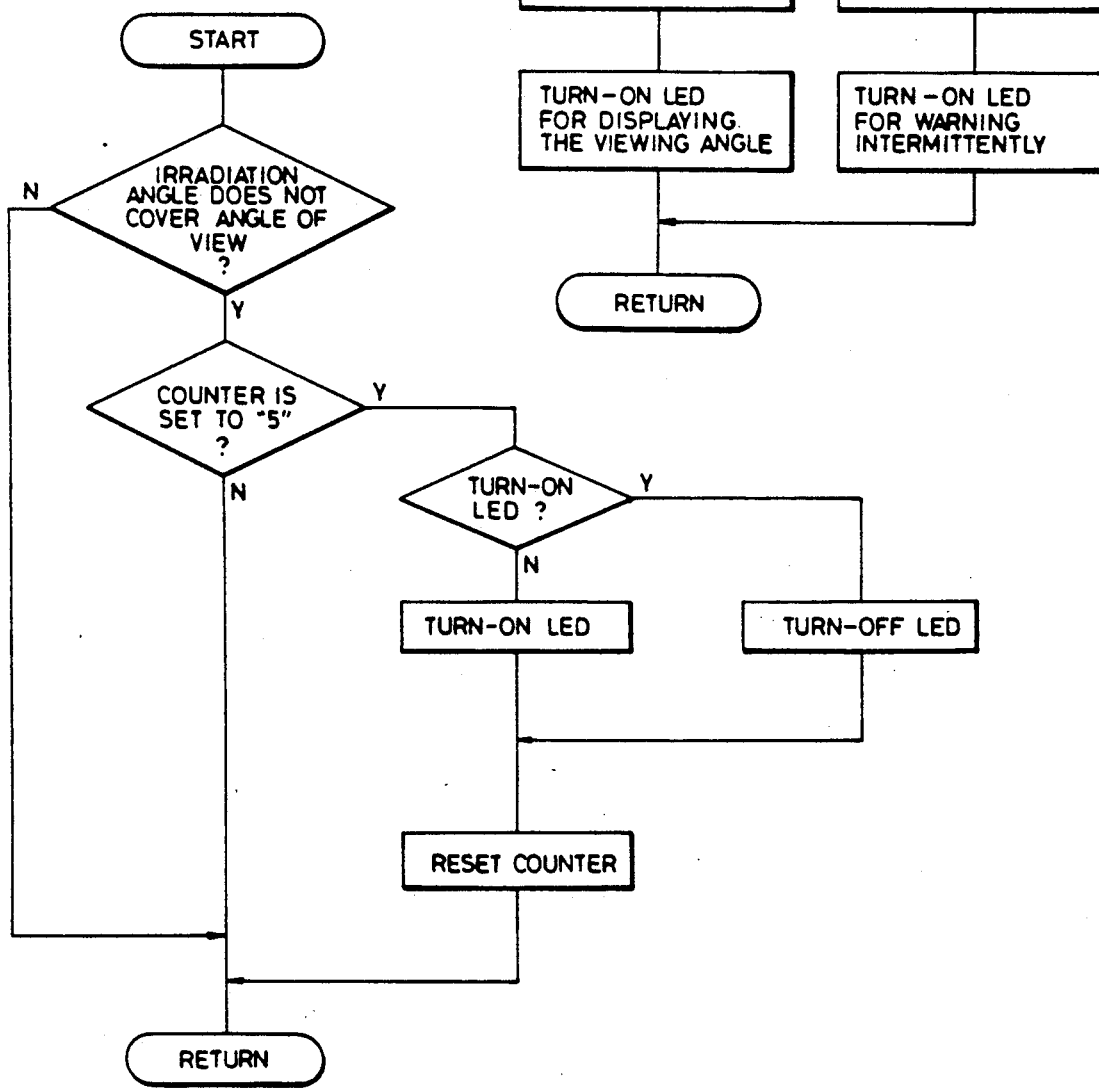
FIG. 20 is a flow chart of producing a warning signal for an irradiation angle.

After the data transmission, an arithmetic operation for an angle of view is carried out. An example flow chart for the arithmetic operation is shown in FIG. 19. During the data transmission, data as to a focal length of a photographing lens mounted to the camera body is transmitted from the camera to the flash device. The microcomputer 15 in the flash device 10 operates to detect, based on the zooming position of the photographing lens and the focal length thereof, whether the angle of view of the photographing lens is within the irradiation angle of the flash device or not. As a result, in the case where the viewing angle is not within the irradiation angle, the LED provided to the flash device is turned on intermittently, and a warning signal is transmitted to the camera. The transmission of data as to the focal length is carried out in the step (6) in the above described TABLE, and the warning signal is transmitted in the step (9) so that the warning signal is produced and/or the flashing operation is inhibited. FIG. 20 is an example of a flow chart for the above described warning. On the other hand, when the pulse signal $P_2$ is set, flash data is output by the switching of data transfer. Moreover, when the pulse signal $P_3$ is set, the operation mode is set to the flash operation mode, and in the next step, the operation mode is set to the flash operation mode processing mode where the the flash operation is controlled and then the quench signal circuit sets by itself the pulse "1" and receives the quench signal. If any of the pulse signals $P_1$, $P_2$ and $P_3$ is not set, operation returns to the initial state and the discriminating process is repeated.

FIG. 7 is a flowchart indicating operations of the microcomputer 36 comprised in the camera 11.

As shown in FIG. 7, when the program starts, the microcomputer 36 allows INT (interruption) immediately after the initial set. Then it is determined whether the camera is set to the photometrical mode or not. When the camera is set to the photometrical mode, the improved type or ordinary type flash device coupled to the camera 11 is monitored in the step ST100. This monitoring is carried out by watching whether the output voltage of comparator shown in FIG. 2 is low or high.

In succession, after issuing instruction to the other routines for the aperture, photometry and exposure calculations, one of the programs corresponding to either the improved type flash device or ordinary type flash device is selected.

In the case where the coupling of the improved type flash device is monitored in the step ST100, the program processings of step ST101 to ST102 are carried out. Meanwhile, when the coupling of the ordinary type flash device is monitored, the program processing of steps ST103 and ST104 are executed.

In the steps ST101 ST102, the flash data is input to the camera 11 after the pulse signal $P_2$ occurs. Namely, the program processings are executed so that after the pulse signal $P_2$ is output to the terminal C as the control signal from the drive circuit 46, the serial clock signal is input through the terminal R and transistor 44 and the serial signal through the terminal Q and transistor 37.

When the ready signal is input from the terminal Q, a flash ready condition is detected and the operation proceeds to the next step.

In the next step, after the pulse signal $P_1$ is generated, the camera data is transmitted to the flash device 10. That is, the program processing is executed so that after the drive circuit 46 of FIG. 2 outputs the pulse signal $P_1$ to the terminal C as the control signal, the serial clock signal is output to the terminal R through the transistor 44 and the serial signal to the terminal Q through the transistor 43.

At the beginning of the steps ST101 and ST102, the interruption is inhibited and at the end of these steps, the interruption is allowed.

In the case where the ordinary type flash device is monitored, the ready signal to the R terminal is watched and the pulse counting is carried out, after the shutter release, until the adequate exposure and the quench signal is output from the terminal Q to stop the flashing. Or after shutter releasing quench signal is output from the terminal Q, upon suitable exposure being obtained, by a well-known light quantity integration circuit (not shown).

In response to the quench signal, an LED symbol indicating correct flash exposure being accomplished is displayed for a certain period of time, two seconds for instance in the view finder.

According to the present invention, the above described certain period of time can be set and detected without any timer circuit and the like.

Figure 4:
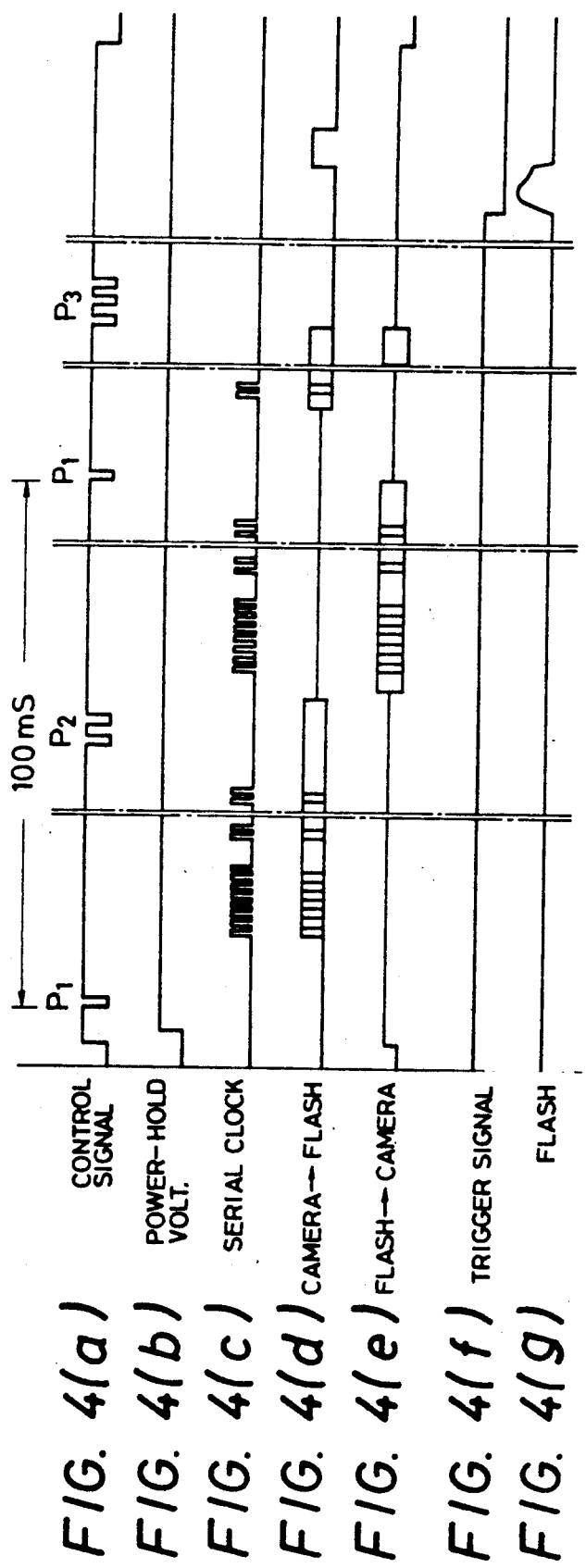
FIG. 4 is a time chart for explaining operations of such flash device.
Figure 25:
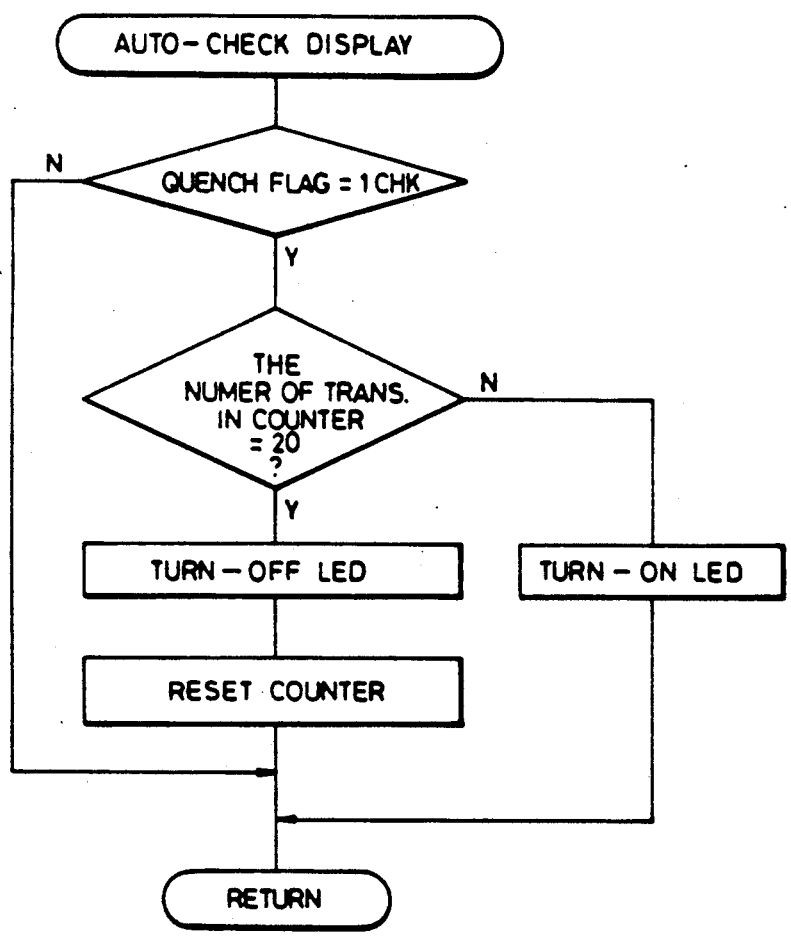
FIG. 25 is a flow chart for automatic check operation.

As shown in FIG. 4, one cycle of data transmission between the camera and the flash device is about 100 msec. Accordingly, by counting the number of data transmissions, it is possible to set the desired period of time. More specifically, in case of turning on the LED for two seconds, this is achieved by turning on the LED for the period of time in which the data transmission is carried out twenty times. Further, in case of turning on the LED intermittently so as to have the frequency of 1Hz, this is accomplished by turning-on the LED for the period of time in which the data transmission is carried out five times and by turning off it for the same period of time. FIG. 25 is a flow chart for the former case. This sub-routine show in FIG. 25 is to be inserted after the "SET COUNT"in the main routine shown in FIG. 6

According to the present invention, the method of displaying the quench display in the improved flash device is different from that in the ordinary flash device. More specifically, in the case where the ordinary flash device is coupled, the intermittent quench display is carried out by hardware in the DPU whereas in the case where the improved flash device is coupled, the intermittent quench display is carried out by software of the microcomputer.

Figure 21:
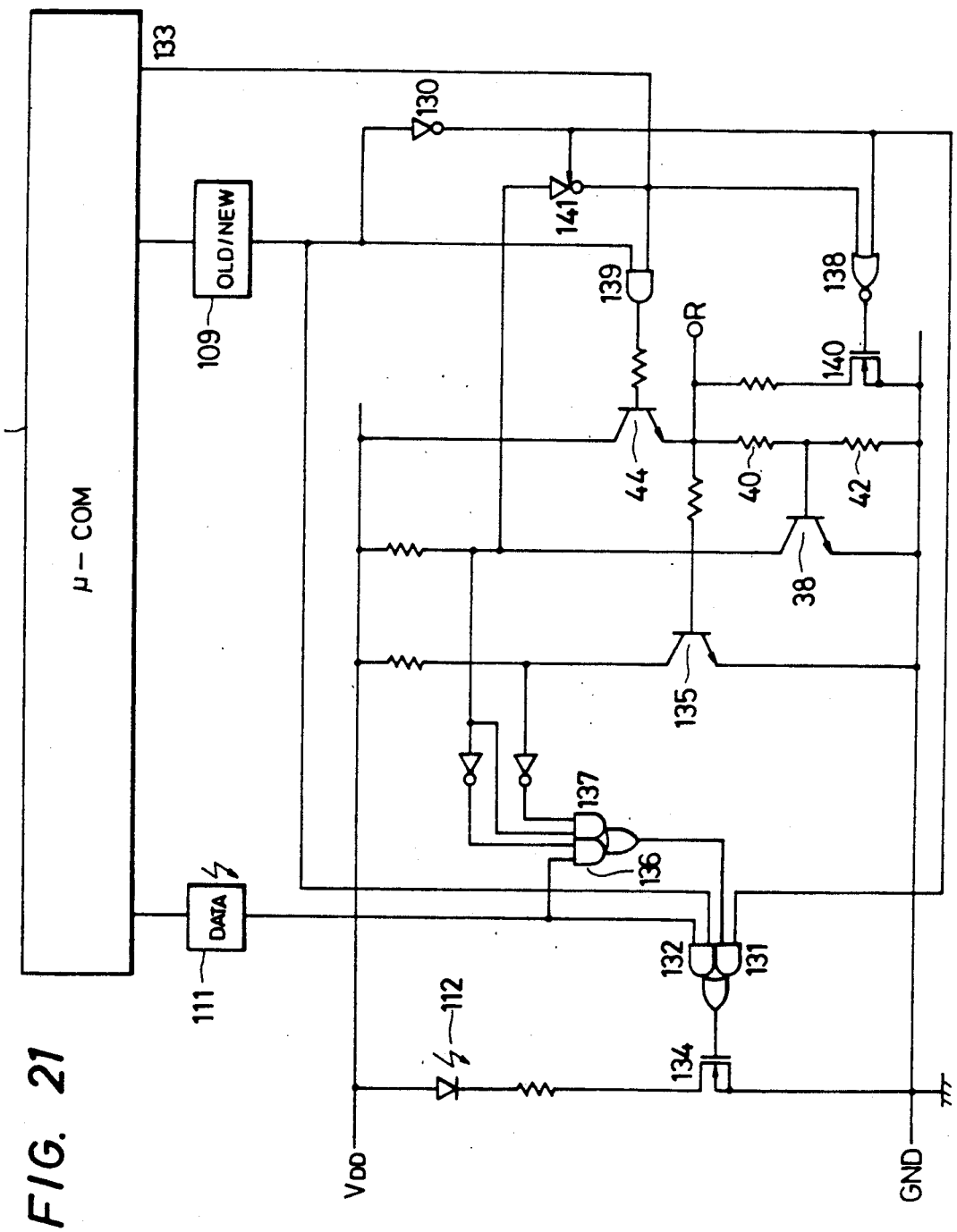
FIG. 21 is a circuit diagram showing peripheral circuits around a terminal R.
Figure 22:
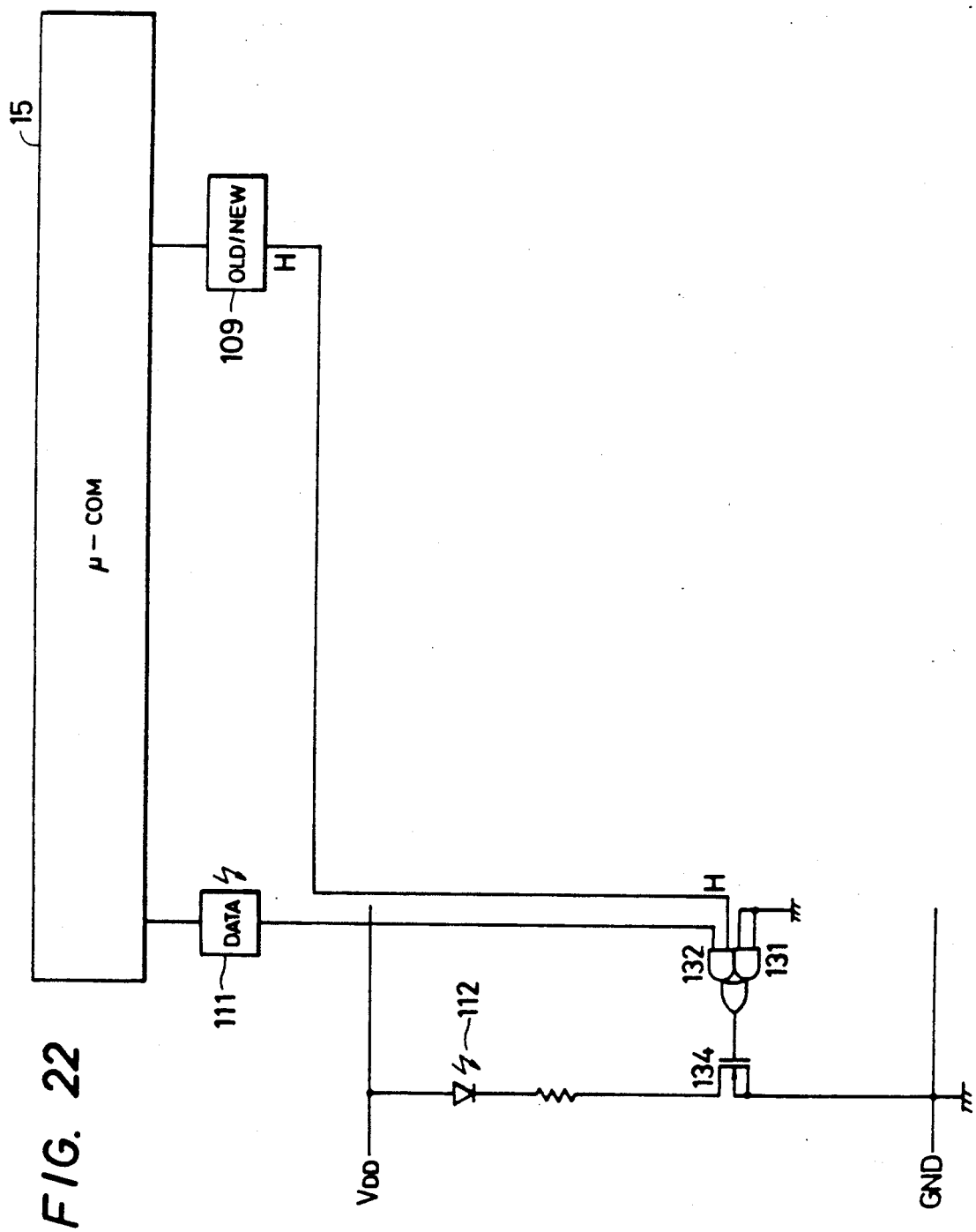
FIG. 22 is a circuit diagram showing an equivalent circuit for producing a quench signal in the case where an improved flash device is coupled.
Figure 23:
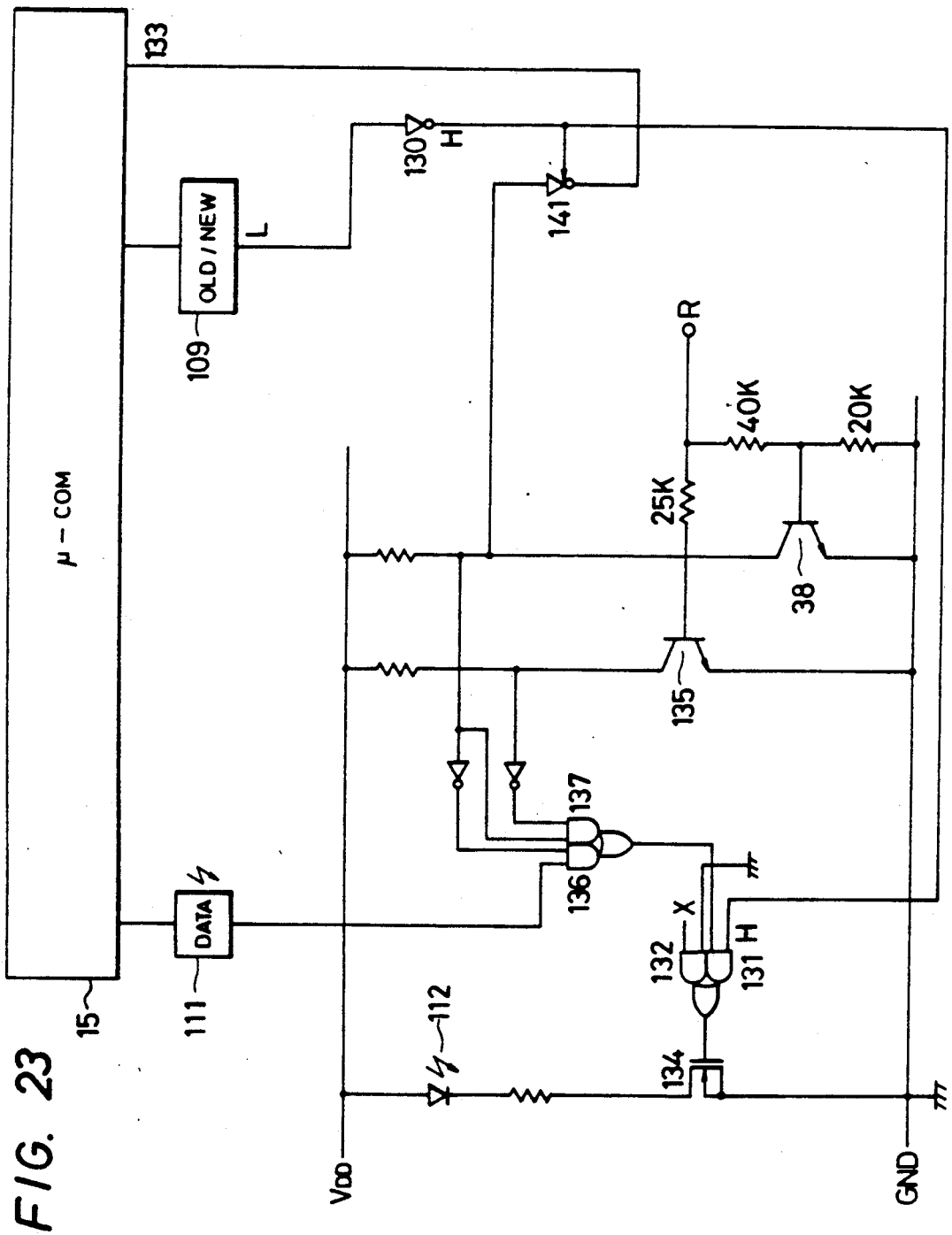
FIGS. 23 and 24 are circuit diagrams showing equivalent circuits for producing the same in the case where the ordinary flash device is coupled.

FIG. 21 is a circuit diagram showing peripheral circuits around the terminal R. FIG. 22 is a circuit diagram showing an equivalent circuit for producing the quench signal in the case where the improved flash device is coupled to the camera body and FIG. 23 is a circuit diagram showing an equivalent circuit therefor in the case where the ordinary flash device is coupled. In the figures, the same elements bear the same reference numerals in the other figures.

In FIG. 21, if the flash which is coupled to the camera body is an improved type, the register 109 is set to "1" and the high level signal is inverted to the low level signal by the inverter 130. An AND gate 131 is disabled by the output of the inverter 130. In case of the output 133 of the microcomputer 15 being low, an AND gate 139 is also disabled. Simultaneously, the outputs of the inverters 130 and 141 are applied to a NOR gate 138, and thus the output of the NOR gate 138 is of high level. Thus, an N-ch FET is turned on resulting in rendering transistors 38 and 135 non-conductive. As a result, AND gates 136 and 137 are both disabled and the resultant circuit is as shown in FIG. 22. Consequently, by varying the output of the register 111, the output of the AND gate 132 can be varied to thereby subject an N-ch FET to an ON/Off operation so that the LED 112 is turned-on intermittently by the software of the microcomputer 15 as described above.

Next, in FIG. 21, the AND gates 132 and 139 are disabled setting the register to the low level. In this case, since the output of the inventor 130 is high, the output of the NOR gate 138 is low. Accordingly, the N-ch FET is rendered non-conductive. Thus, the resultant circuit is as shown in FIG. 23.

In the ordinary flash device, what passes through the terminal R is two signals, one being the charge completion signal and the other being the quench display signal. The former has a relatively high signal level above 2.4V indicating the completion of charging whereas the latter is a pulse signal having a frequency of 2.5Hz and having a signal level of about 1.0 to 1.6V. The latter is produced for about two seconds. As described above, the two signals are different from each other in the signal level.

In FIG. 23, in order to produce the quench display signal, the transistor 135 is adapted to be rendered conductive by a lower voltage.

Upon the completion of charging, the transistors 38 and 135 are both rendered conductive by the above described charge completion signal, resulting in the AND gate 137 being disabled and the AND gate 136 being enabled. The output of the transistor 38 sets the terminal 133 of the microcomputer 15 to high level so that the microcomputer 15 detects the completion of charging. In response to the high level signal, the register 111 is set to a high level, as, a result of which the AND gates 136 and 137 are enabled to thereby turn on the N-ch FET 134 to turn on the LED 112.

Figure 24:
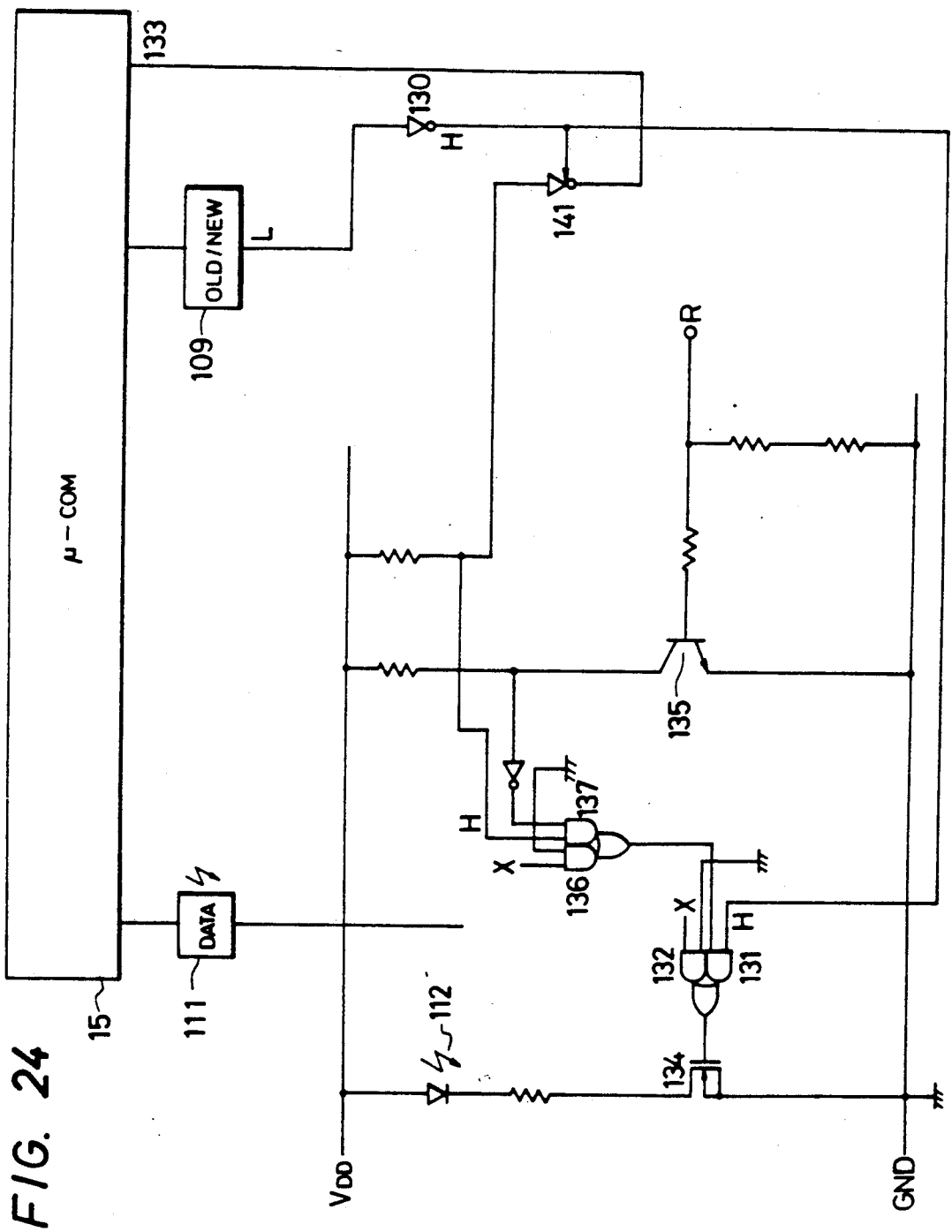

In case of the quench display signal, the signal level thereof is relatively low, and therefore it is impossible to render the transistor 38 conductive. Due to the pull-up function of a resistor, the AND gate 136 is disabled. As a result, the remaining circuit is as shown in FIG. 24. In the circuit of FIG. 24, when the quench display signal is applied thereto, the transistor 35 is subjected to the ON/OFF operation. In this case, since the AND gates 137 and 136 are both enabled, the N-ch FET is also subjected to the ON/OFF operation to thereby turn-on the LED 112 intermittently. Thus, as mentioned above, the operation of the LED 112 can be controlled by the hardware.

In the next program, finder, display and generation of an alarm sound are instructed for the other routine but such operations are repeated until termination of the preset time of a timer.

In FIG. 7. the symbol A indicates a connector and these connectors are all combined.

These steps ST105; ST110 indicate the areas for discriminating generation of interruption and even when the interruption is confirmed in any steps, the operation immediately returns to the initial portion of program.

Figure 8:
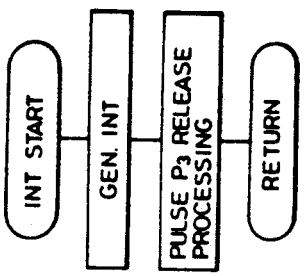
FIG. 8 is a flowchart indicating the interruption loop of the microcomputer provided to the camera.

The interruption is carried out through the interruption loop shown in FIG. 8 when the release mode is set. When the interruption is carried out, the main program stops once and the program shown in FIG. 8 is executed. Thereby, the pulse signal $P_3$ is output to the terminal C as the control signal from the drive circuit 46 of FIG. 2 and the interruption is confirmed in any of the steps ST105 ST110.

Accordingly, the setting of release mode is detected and the program processings for shutter control and release mode reset are carried out.

(2) In the case where the improved type flash device 10 is coupled to the ordinary type camera:

When the flash device 10 is coupled to the ordinary type camera, since this camera is not provided with the terminal corresponding to terminal $C_0$, the terminal $C_0$ becomes an idle terminal.

Therefore, this terminal $C_0$ is maintained low continuously applied to the microcomuputer 15.

When it is determined that the flash device 10 is coupled to the ordinary type camera, the flash device 10 changes its operation mode to the ordinary flash device operation mode. Accordingly, the ready signal is output from the terminal $R_0$ through the transistor 27 of FIG. 2 to the R terminal of ordinary type camera. On the other hand, the flash data and camera data are input or output by the well known method, for example, the aperture data is output to the Q terminal of ordinary type camera from the terminal $Q_0$ through the transistor 26 and the quench signal is applied to the terminal $Q_0$ after the start of flashing. Therefore this flash device 10 operates is the ordinary flash operation mode.

Meanwhile, when the power switch 30 is turned on the transistor 32 is rendered conductive to thereby turn-on the power transistor 33. When the microcomputer 15 determines the ordinary type camera is coupled, the transistor can no longer be turned on. Accordingly, the flash device circuit is not set to the power holding condition but the power transistor 33 is continuously rendered conductive until the flash becomes ready (until a main capacitor reaches the predetermined charged voltage) and thereafter it returns to the OFF state.

It is also possible that the ON period of power transistor 33 is determined to be a very short period while it is not in the power holding state and a power switch is separately provided for the power supply circuit, such as a main capacitor and the like.

(3) In the case where the ordinary type flash device is coupled to the improved type camera 11:

When the ordinary type flash device is coupled to the camera 11, since this flash device is not provided with the terminal corresponding to the terminal C, the terminal C becomes an idle terminal.

Therefore, when the drive circuit 46 generates the control signal, the voltage at the terminal C becomes a high level, a low voltage output of the comparator 48 is input to the microcomputer 36 and the camera determines that the ordinary type flash device is coupled. Namely, as described with the flowchart of FIG. 7, the coupling of the ordinary type flash device is monitored in the step ST100 and the program processings of steps ST103 and ST104 are carried out. As a result, the camera 11 is put in the operation mode for the ordinary type flash device. Accordingly, the transmission of the camera data and the flash data is accomplished to carry out the flash photography by a well known method. For example, the ready signal is applied through the terminal R and transistor 38, the aperture data signal is applied through the terminal Q and transistor 37 and the quench signal is output through the transistor 43 and terminal Q.

While the clip-on type flash device 10 has been explained, the present invention can also be adopted to the grip type flash device.

Figure 9:
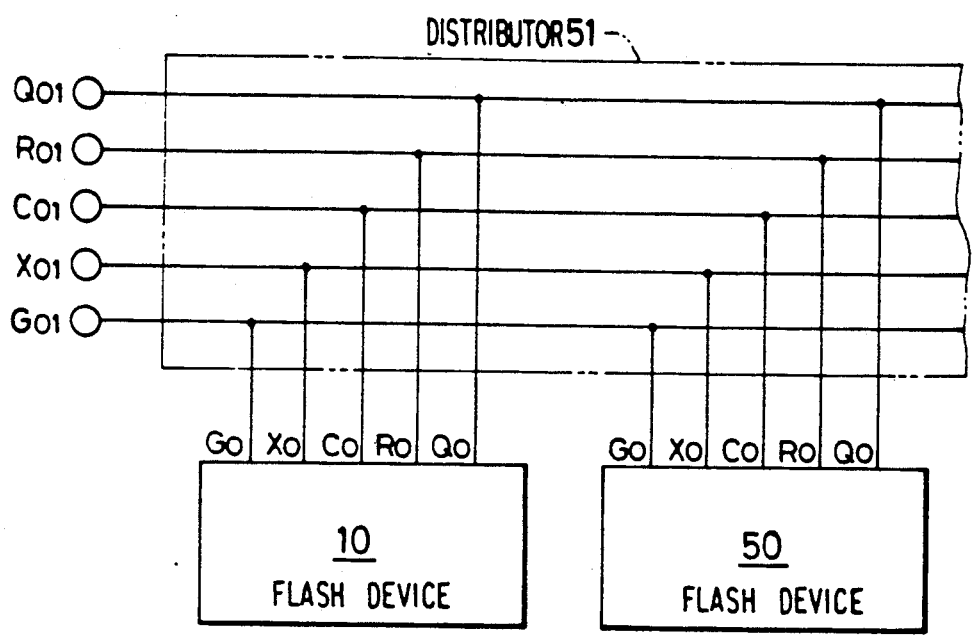
FIG. 9 is an example of a connecting circuit in case the flash devices for an increased number of flash bulbs are loaded.

(4) In the case where the improved type flash device 10 is provided with the flash devices for increasing an amount of flash light:

FIG. 9 is a circuit diagram showing an example for electrically connecting a flash device 50 for increasing an amount of flash light to the improved type flash device 10. The flash device 50 has the same structure as the improved type flash device 10. Terminals $X_0$, $R_0$, $Q_0$, $C_0$, $G_0$ of these flash devices 10 and 50 are connected in common, respectively, by a distributor 51 and the terminals of the flash devices 10 and 50 are electrically connected to those of the improved type camera 11 through terminals $X_{01}$, $R_{01}$, $Q_{01}$, $C_{01}$, $G_{01}$ of the distributor 51.

Figure 10:
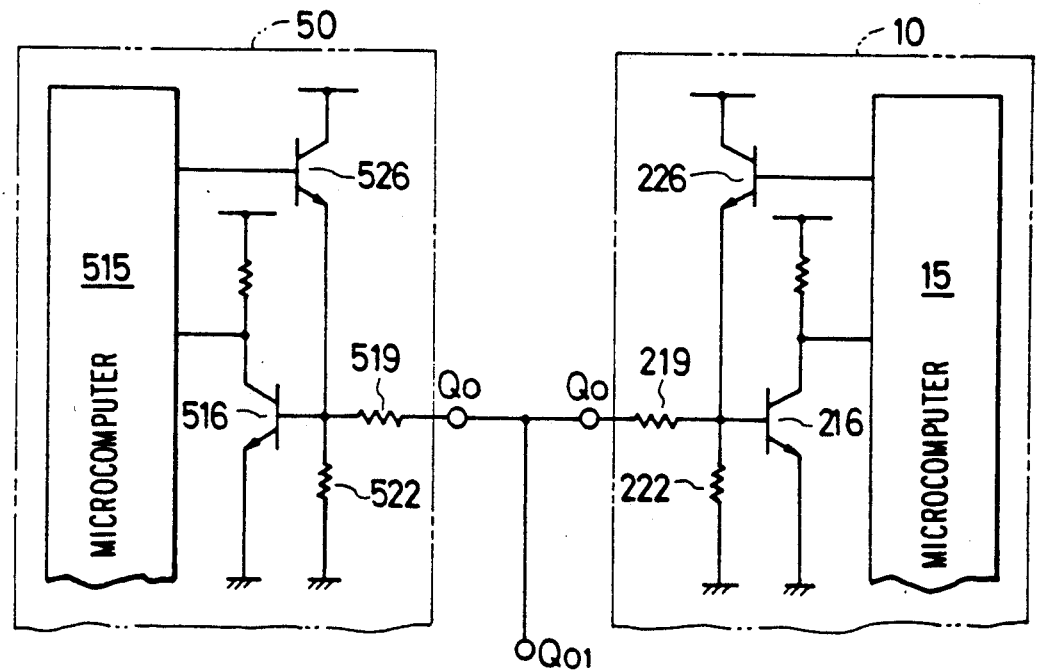
FIG. 10 is a partial circuit diagram indicating the OR logic formed by the signal output circuits of a pair of flash devices.

The flash devices 10 and 50 are provided with input/output circuits for the serial signals, respectively, as shown in FIG. 10. As shown in FIG. 10, a transistor 226 and a resistor 222 form an emitter follower circuit, whereas a transistor 526 and resistor 522 also form an emitter follower circuit. The circuit elements described above constitute an OR logic circuit. The transistor 526 and the resistor 522 of flash device 50 form the output signal path of flash data, while the transistor 516 and the resistor 519 form the input signal path from camera data. Reference number 515 denotes a microcomputer.

With such an OR logic circuit a "0" output is produced at the terminal $Q_{01}$ to output the ready signal when both transistors 226 and 526 are turned-off. Since the signal output is carried out in the level "0", the OR logic circuit is regarded as a NOR logic.

That is, in the flash devices 10 and 50 the transistors 226 and 526 are turned-off when they become ready for flashing. In this case, the output "0" of terminal $Q_{01}$ is combined with a particular signal "1" and the thus obtained ready signal "0, 1" is transmitted to the camera. The particular signal "1" is set by detecting the coupling of the flash device or the flash device 50 for increasing the flash light amount.

When both the flash devices 10 and 50 have been not yet placed in the flash-ready state, both transistors 226 and 526 are rendered conductive. If one of the flash devices 10 and 50 has been placed in the flash-ready state, one of the transistors 226 and 526 is made conductive and an output of the terminal $Q_{01}$ becomes "1". Therefore, the signal "1, 1" which indicates that the flash not yet ready is transmitted to the camera.

Figure 11:
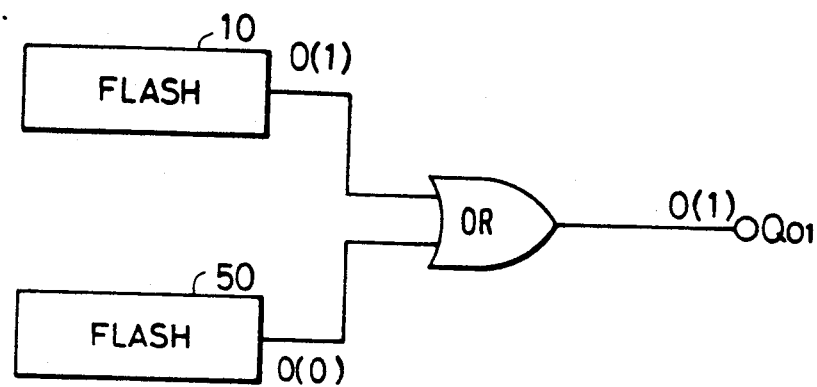
FIG. 11 is a block diagram indicating simplified OR logic.

FIG. 11 is a block diagram showing OR logic in simplified form.

As will be obvious from the above description, when one of the flash devices 10 and 50, for instance, the flash device 10 becomes ready for flashing first, a current flowing through the transistor 526 is divided into the flows, one flowing through the resistor 522 and the other flowing through the path of resistors 519, 219 and 222. But such current is low level and the transistor 526 is repeatedly turned on and off according to the switching of the output of the flash data signal and the input of the camera data signal. Therefore, the operation consumes the least electrical power and further in the above operation, a small current flows into the resistors 219 and 222 of the flash device 10 and it does not have any adverse influence on the operations of the flash device 10. The transistors 226 and 526 of the flash devices 10 and 50 allow the other serial signals such as an aperture data and the like to pass there through as the flash data signal immediately before or after the output of the flash data signal which indicates whether the flashing is ready or not.

In addition, while the flash data signal is being output as described above, the transistors 216 and 516 included in the input circuits of the flash devices 10 and 50 are maintained non-conductive.

The signal output circuit including the emitter follower circuits comprises field effect transistors which are low in power consumption.

Figure 12:
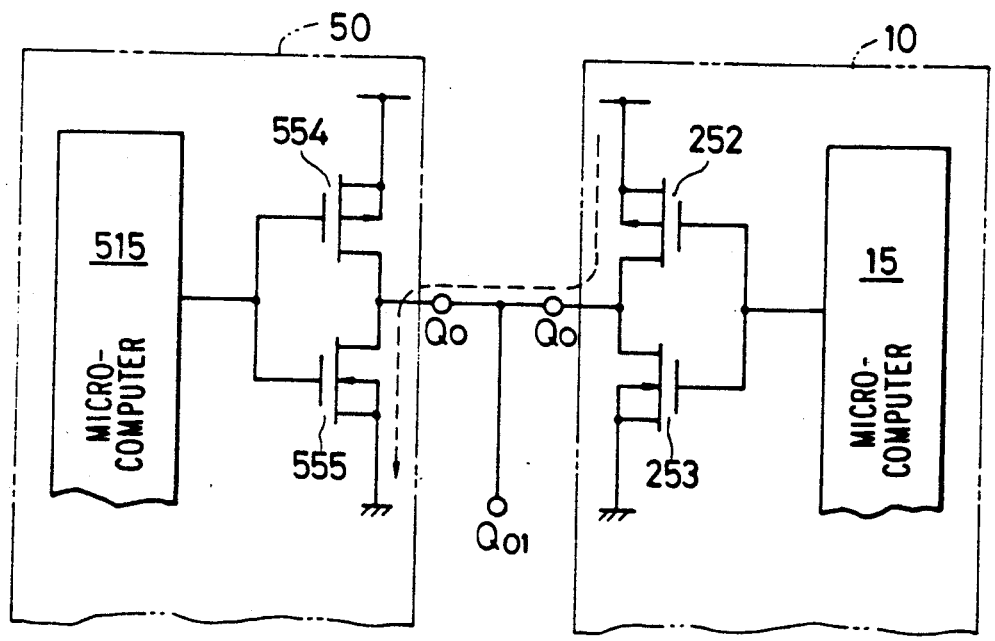
FIG. 12 is a circuit diagram indicating an example of the signal output circuit utilizing the MOS FET.

FIG. 12 is a circuit diagram showing an example of the signal output circuit in which the inverter including MOS P-channel FET 252 and MOS N-channel FET 253 is provided to the flash device 10, while the inverter including FETs 554 and FET 555 to the flash device 50.

However, such a signal output circuit is not suitable because a circuit short circuiting the power source occurs when one of the flash devices 10 and 50 becomes ready for flashing. For instance, when the flash device 10 becomes ready for flashing and an inverter input becomes low level, an FET 252 is turned on. In this case, if the flash device 50 has not yet been placed in the flash-ready state, the inverter input is at a high level to thereby render the FET 555 conductive. To this end, a current flows as indicated by a dotted line and the power supply is short-circuited.

The flash device of the clip-on type has been described above, but the present invention can also be adopted to the grip type flash device. The number of flash devices for increasing the flash light amount is not limited to one, and a plurality of flash devices may also be coupled and they are also subjected to an OR logic function.

Furthermore, the signal output circuit of the present invention is not limited to the improved type flash device 10 and is available as a ready signal output circuit of an ordinary flash device.

Figure 13:
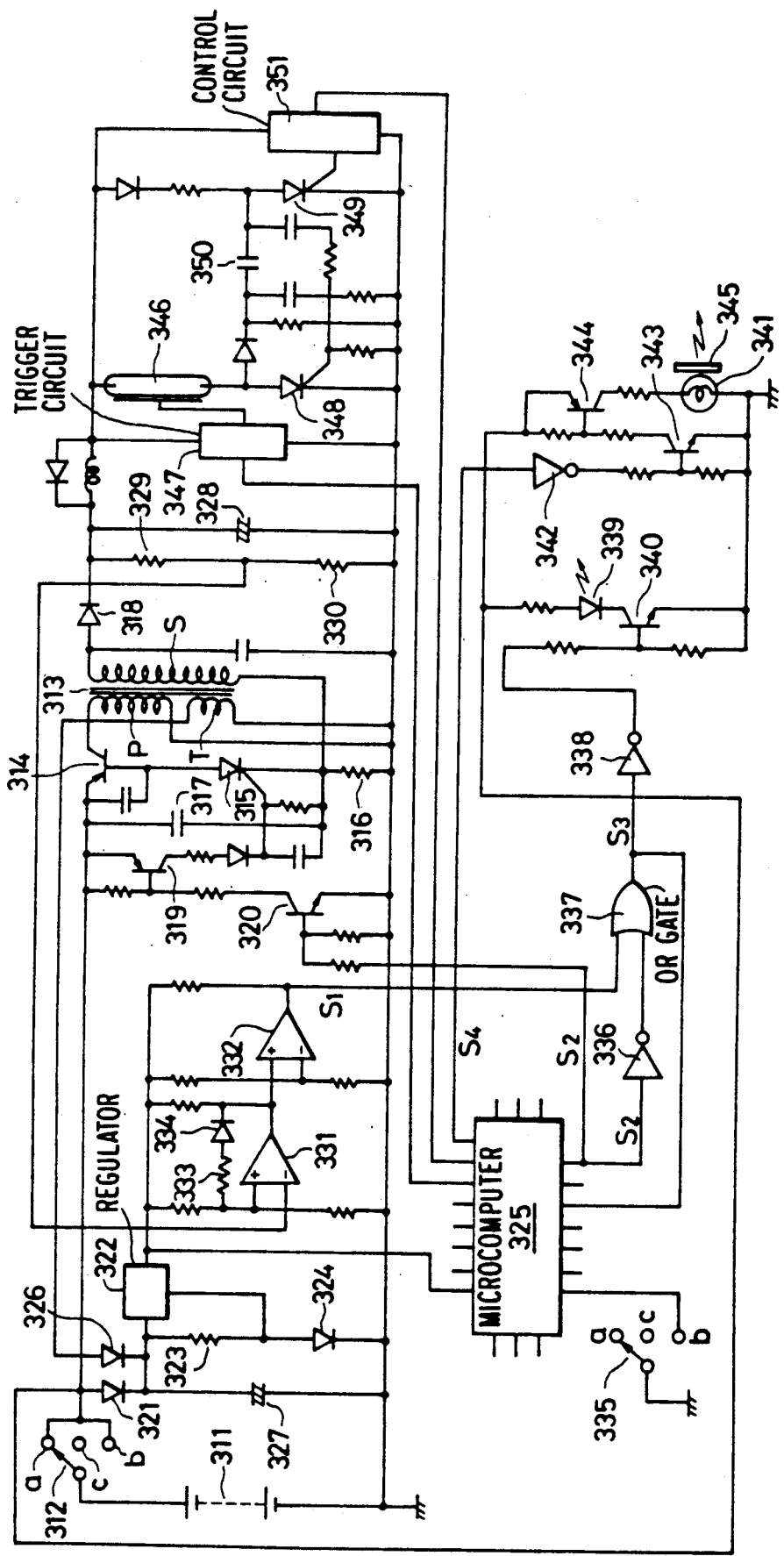
FIG. 13 is circuit diagram showing a power source circuit for use in a flash device having an auxiliary light source, which is to be used with a photographing camera having an autofocusing capability.

FIG. 13 is circuit diagram showing a power source circuit for use in a flash device having an auxiliary light source, which is to be used with a photographing camera having an auto-focusing capability. In FIG. 13, reference numeral 311 denotes a battery; 312, a power supply switch having a movable contact which selectively contacts with stationary contacts a, b and c; 313, an oscillation transformer including a primary coil P, a secondary coil S and tertiary coil T. A transistor 314 connected to the positive bus of the battery power supply 311 between the primary coil P and a power supply switch 312 is an oscillation transistor.

This oscillation transistor 314 is provided as a grounded base transistor and the base thereof is connected to the negative bus of the battery 311 through an SCR 315 and a resistor 316. A capacitor 317 provided between the emitter of oscillation transistor 314 and the cathode of the SCR 315 forms a time constant circuit with the resistor 316.

One end of the secondary coil S of the oscillation transformer 313 is connected to the cathode of the SCR 315 whereas the other end thereof is connected to the rectifying diode 318. The tertiary coil T is a power supply coil which compensates for voltage drop of the battery 311 by utilizing its induced voltage. The respective members 313~318 form a DC-DC converter.

This DC-DC converter is allowed to oscillate, when the transistor 319 having the emitter connected to the positive bus is turned on so that a current flows into the gate resistor of the SCR 315. Moreover, this transistor 319 is turned on or off by controlling a bias current of the transistor 319 by the transistor 320 having an emitter coupled to the negative bus.

Meanwhile, a block 322 connected to the power supply switch 312 through an anti-reverse current diode 321 constitutes a regulator with a resistor 323 and a diode 324 and an output voltage of the regulator is applied to a microcomputer 325 as a voltage detection circuit for main capacitor and a signal processing circuit.

In addition, the regulator 322 is connected to the tertiary coil T of the oscillation transformer 313 through the anti-reverse current diode 326 and an induced voltage generated on the tertiary coil T is smoothed by a capacitor 327 during the oscillation of the DC-DC converter and the smoothed voltage is applied to the regulator 322 as an input voltage. The voltage detection circuit described above comprises bleeder resistors 329 and 330 provided in parallel with the main capacitor 328 on the output side of the DC-DC converter, an operational amplifier 331 which receives the power supply from the regulator 322 and a high input impedance circuit 332.

A divided voltage defined by the bleeder resistors 329 and 330 is applied to an inversion input terminal of the operational amplifier 331 whereas a reference voltage is applied to a non-inversion input terminal thereof. The operational amplifier 331 is also provided with a resistor 333 and a diode 334 which apply positive feedback to the non-inversion input terminal in order to give a hysteresis characteristic to an output voltage approximately equal to a threshold voltage.

The high impedance circuit 332 is also an operational amplifier having a non-inversion input terminal to which the output of the operational amplifier 331 is applied. A reference voltage is applied to an inversion input terminal of the amplifier 331 which outputs the flash ready signal.

The microcomputer 325 operates to output the flash data signals such as a ready signal and an aperture data signal to the camera as shown in FIG. 14(c), and to receive the camera data signal such as an auxiliary light source lighting instruction signal and a quench signal as shown in FIG. 14(d). The microcomputer 325 acts as the signal processing circuit to process these signals according to a serial clock signal shown in FIG. 14(b).

FIG. 14(e) shows the timing of the auxiliary light source being turned on in response to the lighting instruction signal of FIG. 14(d). Further, FIG. 14(f) shows the timing of the start of automatic focusing operation in response to a signal contained in the serial signal of FIG. 14(c) representing that auxiliary light source 400 has been turned on.

The microcomputer 325 is provided with a selection switch 335 and this switch 335 selects the operation mode.

The selection switch 335 has a movable contact which selectively contacts with one of stationary contacts a, b and c in conjunction with the power switch 312. When the switch is set to the contact a, the microcomputer 325 is set to the first operation mode. When it is set to the contact b, the microcomputer is set to the second operation mode. The contact c is an OFF position.

In the first operation mode of the microcomputer 325, a high level output signal $S_2$ is applied to the base of transistor 320 to allow an oscillation of the DC-DC converter. In the second operation mode, since the output signal $S_2$ is set to the low level, the oscillation of the DC-DC converter is stopped.

The output signal $S_2$ is supplied to one input terminal of an OR gate 337 through an inverter 336. This OR gate 337 has another input to which the output $S_1$ of the voltage detection circuit is applied. The output $S_3$ of the OR gate 337 is applied both to the microcomputer 325 and to the base of a transistor 340 which forms a drive circuit of a light emitting diode 339, through the inverter 338.

This light emitting diode 339 is turned-on to emit light when the main capacitor 328 is charged up to a predetermined voltage level indicating that the flash is ready.

Meanwhile, the microcomputer 325 outputs an output signal $S_4$ under a certain condition in order to operate the drive circuit of the auxiliary light source 341. This drive circuit outputs the signal $S_4$. When the signal $S_4$ changes to low level from high level, the transistor 343 which receives the high voltage output of inverter 342 at the base is turned on to thereby render the biased transistor 344 conductive to energize the auxiliary light source 341.

In FIG. 13, the auxiliary light source 341 is a filament lamp, and the power is fed from the battery 311. A red-color filter 345 is provided in the projecting path of this auxiliary light source 341.

The filter 345 is not always required. Reference number 346 designates a flash discharge bulb; 347, a trigger circuit; 348 and 349, SCRs; 350, a commutation capacitor forming a flash stop circuit together with the SCRs 348 and 349; and 351, a control circuit which energizes the flash stop circuit. These members and circuits are well known.

Next, an operation of such an embodiment as above will be described hereunder.

(1) In case of the power switch 312 being set to the contact a:

When the power switch 312 is set to the contact a from the OFF position contact c, the selection switch 325 is also set to the contact a. In this timing, the main capacitor 328 is not charged. Under this condition, the microcomputer 325 is set to the first operation mode, and thus the output signal $S_2$ is of high level. Therefore, the transistor 320 is turned-on so that the transistor 319 is forward biased. When the capacitor 317 is charged up to a predetermined value, the transistor 319 is turned on to thereby apply a gate voltage to the SCR 315. When the SCR 315 is turned-on, the oscillation transistor 314 is also turned on. The SCR 315 receives at a cathode a reverse electromotive force generated on the secondary coil S of the oscillation transformer 313 immediately after the oscillation transistor 314 is turned on, and thus the SCR 315 is rendered non-conductive. Then, the oscillation transistor 314 is turned-off. The DC-DC converter oscillates with the repetition of ON and OFF states of the oscillation transistor 314 to thereby charge the main capacitor 328.

Meanwhile, when the DC-DC converter oscillates, an induced voltage generated on the tertiary coil T is applied to the regulator 322 as an input voltage through the diode 326 after smoothing by the capacitor 327.

In this case, if the induced voltage value is lower than the voltage value of the battery 311, the voltage of battery 311 becomes an input voltage to the regulator 322. On the contrary, when it is higher than that of the battery 311, this voltage becomes an input voltage. Such a fact that the induced voltage is relatively high represents that the battery 311 shows voltage drop due to the consumption.

The regulator 22 whose input voltage is compensated as described above, can output a stabilized voltage with high accuracy and this output voltage is supplied to the voltage detection circuit including the operational amplifier 331 and the microcomputer 325 as the power supply.

An output of the operational amplifier 331 is adapted to not be inverted, while the charging voltage of main capacitor 328 reaches the flash ready voltage of the flash bulb 346. The high input impedance circuit 332 outputs the signal $S_1$ in response to the high level of this signal and the signal $S_1$ is applied OR gate 337. The microcomputer 325 provides the output signal $S_2$ of high level. This output signal $S_2$ is applied to the OR gate 337 through the inverter 336 and therefore the OR gate 337 provides an output signal $S_3$ of high level.

Since the transistor 340 of the drive circuit is maintained non-conductive while the output signal $S_3$ is of high level, the light emitting diode 339 indicating the flashing ready condition is not turned on. Moreover, the output signal $S_3$ of high level is also applied to the microcomputer 325. In response to the signal $S_3$, the microcomputer 325 operates to output a lighting inhibit signal for an auxiliary light source 341 to the camera as a flash data. Since no lighting instruction signal for the auxliary light source 341 is transmitted from the camera, the output signal $S_4$ is kept at the high level. As a result, the transistors 343 and 344 of the drive circuit are maintained non-conductive and the auxiliary light source 341 is turned on.

When the charging of main capacitor 328 proceeds and the charging voltage reaches the flash ready voltage, the output signal of the operational amplifier 331 is inverted to a low level output. However, since the operationsl amplifier 331 has a hysteresis characteristic, as the charging voltage of the main capacitor 328 becomes higher, the output voltage of the operational amplifier 331 is pulsated within a certain range in a low voltage level.

The output signal $S_1$ of the high input impedance circuit 332 changes to the low level from the high level in accordance with the low level output of the operational amplifier 331 and the output signal $S_3$ of the OR gate 337 becomes low level.

The transistor 340 of the drive circuit is turned-on to turn on the light emitting diode 339 indicating the flashing ready condition when the output signal $S_3$ of the OR gate 337 becomes low level.

In response to the low level of the output signal $S_3$ level, the microcomputer 325 operates to transmit a signal to the camera as the flash data signal, which allows the auxiliary light source 341 to light.

Under the above operating condition, upon the application of the lighting instruction signal of the auxiliary light source 341 from the camera, the output signal $S_4$ changes to the low level signal, and the transistors 343 and 344 are turned on to supply the power from the battery 311 to the auxiliary light source 341.

As described above, in the case where the power switch 312 and the selection switch 335 are set to their terminals a, respectively, the DC-DC converter is allowed to oscillate, and the auxiliary light source 341 is inhibited to light until the main capacitor 328 has been charged up to the flash ready level.

(2) In case of the power switch 312 being set to the contact b:

When the power switch 312 is set to the stationary contact b from the OFF contact c, the selection switch 335 is also set to the contact b.

Assuming that the main capacitor 328 is not charged, the microcomputer 325 is put in the second operation mode to output an output signal $S_2$ of low level in response to the low level signal $S_2$, the transistors 319 and 320 are maintained non-conductive, the oscillation of DC-DC converter is inhibited.

In this case, since the oscillation of DC-DC converter stops as described above, no induced voltage is generated in the tertiary coil T. Therefore, only a voltage of battery 311 is applied to the regulator 322 as an input voltage. However, since power consumption is very small in the DC-DC converter, the battery 311 shows a little voltage drop and the output of the regulator 322 acts as a stabilized voltage.

Applied to the OR gate 337 is the high voltage output signal $S_1$ of the high input impedance circuit 332 and the high voltage output signal $S_2$ of the microcomputer 325, and therefore the OR gate 337 produces an output signal $S_3$ of high level. As a result, the transistor 340 of the drive circuit is maintained non-conductive and the light emitting diode 339 is not allowed to emit light.

When the microcomputer 325 outputs a high voltage signal $S_3$, the selection switch 335 is set to the contact b and the microcomputer 325 is thus in the second operation mode. Therefore, the signal which allows the lighting of the auxiliary light source 341 is transmitted immediately to the camera.

Accordingly, if the lighting instruction signal of the auxiliary light source 341 is applied from the camera, the output signal $S_4$ becomes low level, so that the transistors 343 and 344 of the drive circuit is turned on to thereby light the auxiliary light source 341.

Assuming that the power switch 312 and the selection switch 335 are set to their contact b under the condition that the main capacitor 328 is charged to the level higher than the flash-ready level, the output signal $S_1$ of the high input impedance circuit 332 is at a low level but the output signal $S_3$ of the OR gate 337 is at a high level, and therefore, the same operation as described above is also carried out.

But, in such a case, the light emitting diode 339 is maintained turned off even in the case where the charging voltage of main capacitor 328 reaches the flash-ready level. When the power switch 312 and the selection switch 335 are set to the contact b, the DC-DC converter stops oscillation and the auxiliary light source 341 is allowed to light.

As described above, when the flash device of the present invention is coupled to the improved type camera, the improved flash mechanism is put in an operation mode corresponding to such a camera. On the other hand, when the flash device is coupled to the ordinary type camera, the flash mechanism is put in an ordinary operation mode corresponding to such a camera. Therefore, the camera to be coupled is not restricted and the flash device of the present invention has compatibility for a variety of cameras.

With such a flash device, terminals $R_0$, $Q_0$ are used as the terminals for transmitting respective data signals in the operation modes of the ordinary type flash mechanism and improved type flash mechanism, and thus it is only necessary to provide a control terminal $C_0$ for switching the operation mode in order to provide the improved type flash mechanism. Accordingly, the number of terminals for electrically connecting the camera may be minimized.

Moreover, the control terminal is provided to put the ordinary flash mechanism and the improved flash mechanism in an operation mode selectively. It is discriminated whether the flash device is coupled to the ordinary type camera or to the improved type camera from the change of voltage at the control terminal. Accordingly, this discriminating means can be formed by a resistance member connected, for example, to the control terminal and therefore the present invention is advantageously simple in construction.

In the case where an ordinary type flash device is coupled to a camera of the present invention, a control terminal voltage is unchanged because this flash device is not provided with a control terminal corresponding to.. the control terminal, of the camera. On the camera side, it is determined that the ordinary type flash device is coupled and the camera mechanism interlocking with the ordinary type flash device is put in the operation mode.

In the case where an improved type flash device is coupled to the present camera, the control terminal of the camera is electrically connected with the control terminal of the flash device and thus a control terminal voltage changes. As a result, it is determined ON the camera side that an improved type flash device is coupled and the camera mechanism interlocking with the improved type flash device is put in the operation mode.

As described above, the power supply circuit of the present invention includes a regulator to which a DC voltage of battery power supply is applied, a power supply coil which is provided to the oscillation transformer of a DC-DC converter and a smoothing capacitor which smooths an induced voltage generated on the power supply coil. when the DC voltage of the battery is lower than a predetermined value, the induced voltage compensates for voltage drop. Consequently, the power supply circuit can serve as a constant power source which can supply a stabilized power to a signal processing circuit requiring a constant reference voltage.

In the power supply circuit for the flash device having an auxiliary light source of the present invention, the signal processing unit is put in the first operation mode to allow the auxiliary light source to light when the main capacitor is charged up to the flash ready level and when the signal processing unit is then put in the second operation mode, the charging operation of main capacitor is stopped and immediately the auxiliary light source is allowed to light.

Accordingly, since the auxiliary light source is caused to light under the condition that powe consumption in the battery due to the DC-DC converter is lowered remarkably or the oscillation operation of the DC-DC converter is stopped, sufficient power is supplied to the auxiliary light source from the battery resulting in obtaining sufficient amount of the light.

Furthermore, since the auxiliary light source can be lit freely regardless of the charging condition of the main capacitor, it is possible for a photographer to observe the focusing condition and photographing angle through the view finder prior to the flash photographing.

Moreover, according to the present invention, after the camera receives a signal representing the fact that an auxiliary light source in the flash device is put in a lighting condition, a signal for turning on the auxiliary light source is then transmitted to the flash device and after the confirmation of lighting of the auxiliary light source, an auto-focusing operation is carried out. Further, the auto-focusing operation is started after time lag until the complete lighting of the auxliary light source is obtained, and thus the auto-focusing operation is accomplished effectively. Therefore, incorrect focusing rarely occurs.

What is claimed is:

1. A flash device for a photographing camera comprising a housing containing an ordinary flash mechanism, an improved flash mechanism, and an operation mode switching means which selectively switches the operation mode of said flash mechanism, a connector on said housing having a plurality of terminals for electrically connecting said ordinary flash mechanism to said photographing camera, said plurality of terminals carrying all signals necessary to operate said ordinary flash mechanism, said connector further including a control terminal which is provided in addition to said plurality terminals for electrically coupling said operation mode switching means to the camera, wherein said operation mode switching means switches an operation mode between said ordinary flash mechanism and said improved flash mechanism in response to an input signal to said control terminal.

2. The device as claimed in claim 1 wherein said operation mode switching means comprises a resistance means which is connected to said control terminal to change a control terminal voltage when a signal is applied to said control terminal and to maintain the control terminal voltage unchanged when the signal is not applied to said control terminal, said improved flash device being put in the operation mode in response to the change of said control terminal voltage whereas said ordinary flash mechanism is put in the operation mode when said control terminal voltage is maintained.

3. A photographing camera compatible with improved and ordinary type flash devices, said camera comprising:
 a plurality fo terminals for electrically connecting an ordinary type flash device to said camera, said plurality of terminals being sufficient to carry all necessary operating signals between said camera and said ordinary flash device,
 a control terminal in addition to said terminals for electrically connecting an improved flash device to said camera in conjunction with said plurality of terminals, and
 means for detecting the coupling of an ordinary type flash device to said camera in response to no change of a terminal voltage on said control terminal and for detecting the coupling of an improved type flash device to said camera in response to a change of said terminal voltage;
 at least one of said plurality of terminals carrying a first type of signal between said camera and said ordinary type flash device when said detecting means detects the coupling of an ordinary type flash unit and carrying a second type of signal between said camera and said improved type flash device when said detecting means detects the coupling of an improved type flash device.

4. An interlocking system for an improved photographing camera and an improved flash device, said improved photographing camera having a first camera operation mode with said improved flash device and a second camera operation mode with an ordinary flash device, said improved flash device having a first flash operation mode for said improved photographing camera and a second flash operation mode for an ordinary photographing camera comprising:
 a first control terminal provided on said improved flash device for connection only to said improved photographing camera and not to an ordinary camera;
 a second control terminal provided on said improved camera for connection to said improved flash device, said second control terminal being electrically connected to said first control terminal when said improved flash is mounted to said improved photographing camera; and
 a power supply means for causing a predetermined variation in voltage to occur across said first and second control terminals when said first and second control terminalsare coupled to each other,
 said improved photographing camera and improved flash device being put automatically in said first camera operation mode and said first flash operation mode, respectively, upon detection of said predetermined variation in voltage across said first and second control terminals.

5. The interlocking system as defined in claim 4 wherein said improved photographing camera is automatically placed in said second camera operation mode when there is no predetermined variation in voltage across said first control terminal when said ordinary flash device is coupled to said improved photographing camera.

6. The interlocking system as defined in claim 5 wherein said improved photographing camera further comprises:
 a display circuit having a display unit which is capable of being switched in response to a change from said first operation mode to said second operation mode, said display unit being capable of displaying a difference between an auto-check operation when said improved flash device is electrically coupled thereto and an auto-check operation when said ordinary flash device is electrically coupled thereto.

7. The interlocking system as defined in claim 4 wherein said improved flash device is automatically placed in said second flash operation mode when there is no predetermined variation in voltage across said second control terminal when said improved flash device is coupled to said ordinary photographing camera.

8. The interlocking system as defined in claim 4 wherein said improved photographing camera further comprises:

a signal source for transmitting first, second or third control signals through said first and second control terminals to said improved flash device; and a signal switching control means for selectively allowing a camera data signal to be transmitted from said improved photographing camera to said improved flash device in response to said first control signal and for selectively allowing a flash data signal to be transmitted from said improved flash device to said improved photographing camera in response to said second control signals, said signal switching control means operating so that said third control signal is transmitted when said improved photographing camera is put in a shutter release mode, so as to place said flash device in a light emitting processing mode.

9. The interlocking system as defined in claim 8 wherein said improved photographing camera further comprises:

means for repeatedly transmitting said first and second control signals with a predetermined period, and wherein one of said improved photographing camera and said improved flash device comprises a counter for counting said first and second control signals to thereby detect the number of the signal transmissions, wherein the counting period of time of said counter is detected to be used as a timer.

10. The interlocking system as defined in claim 8 wherein said improved flash device further comprises:
a signal processing circuit, and during first camera data transmission to said improved flash device, a camera mode signal contained in said camera data signal is transmitted as predetermined dummy data so that said improved flash device uses said dummy data to carry out parity check in a said signal processing circuit.

11. The interlocking system as defined in claim 8 wherein when said auxiliary light is illuminated, a signal indicating said illumination of said auxiliary light is transmitted to said improved camera as a part of said flash data signal, and wherein said improved camera performs an automatic focusing operation in response to said flash data signal.

12. The interlocking system as defined in claim 8 wherein said flash data signal includes a signal indicating a guide-number to be supplied to said improved camera, said signal indicating said guide-number is prevented from being supplied to said improved camera when said flash is set to a bouncing operation.

13. The interlocking system as defined in claim 4 wherein said improved photographing camera further comprises:

a display circuit having a display unit which is capable of being switched in response to a change from said first operation mode to said second operation mode, said display unit being capable of displaying a difference between an auto-check operation when said improved flash device is electrically coupled thereto and an auto-check operation when said ordinary flash is electrically coupled thereto.

14. An improved flash device for use with both an ordinary camera and an improved camera, said improved flash device having a flash light generating means in which an energy accumulated in a main capacitor that is charged by a DC-DC converter boosting a low voltage produced by a DC power source is converted into an optical energy to produce a flash light, comprising:

a signal processing means which is switched selectively between a first switching mode and a second switching mode by a switching means operating in response to a signal received only from an improved camera; and an auxiliary light for automatic focusing, which is actuated by said DC power source under control of said signal processing means, wherein when said signal processing means is switched to said first switching mode, said DC-DC converted is allowed to oscillate and said auxiliary light becomes ready in response to a detection signal from a voltage detection circuit, said detection signal indicting that said main capacitor is charged up to a predetermined voltage, and wherein when said signal processing means is switched to said second switching mode, said DC-DC converter stops the oscillation and said auxiliary light becomes ready, said signal processing means receiving a lighting instruction signal from said improved camera in a flash ready state to control the lighting of said auxiliary light.

15. An improved flash device comprising:
a main capacitor;
a DC power source;
a DC-DC converter for boosting a DC voltage supplied from said DC power source to charge said main capacitor;
a constant voltage supply means including a signal processing circuit for transmitting and receiving a data signal between said flash device and a photographing camera;
a regulating means, receiving said DC voltage supplied from said DC power source, for supplying DC power to said constant voltage supply means;
a coil for power source, which is coupled to an oscillation transformer included in said DC-DC converter; and
a smoothing capacitor for smoothing an induction voltage in said coil caused by oscillation of said DC-DC converter, said smoothed voltage being applied to said regulating means as an input voltage.

16. An improved flash device capable of transmitting a flash data signal to a photographing camera and receiving a camera data signal from said photographing camera comprising:

a signal output means for said flash data signal, which is formed as an emitter follow circuit, wherein when a plurality of said improved flash devices are employed to increase an amount of flash light, said emitter follower circuits of said plural improved flash devices constitute an OR logic circuit.

17. The improved flash device as defined in claim 16 wherein when said plural flash devices become ready for flashing, the OR logic circuit operates to produce an output signal indicating that all of said flash devices are ready for flashing when said flash data signal is in a low state.

18. A camera operable with at least first and second different flash devices, said camera comprising:
a first set of terminals for exchanging signals with said first flash device;

at least one further terminal for connecting said camera only to said second flash device; and discriminating means coupled to said further terminal for determining which of said first and second flash devices is connected to said camera.

at least one of said first set of terminals carrying a first type of signal between said camera and said first type flash device when said discriminating means detects the coupling of a first type flash unit and carrying a second type of signal between said camera and said second type flash device when said discriminating means detects the coupling of a second type flash device to said camera.

19. A camera according to claim 18, wherein said discriminating means comprising:

means for applying a discriminating signal to said further terminal; and voltage detection means for detecting the voltage at said further terminal resulting from said discriminating signal, and for determining that said first flash device is connected when the voltage at said further terminal is at a first level and for determining that said second flash device is connected when the voltage at said further terminal is at a second level.

20. A camera according to claim 18, further comprising first and second camera mechanisms, and means responsive to said discriminating means for activating said first camera mechanism when said first flash device is connected and for activating said second camera mechanism when said second flash device is connected.

21. A camera suitable for use with different types of flash units, said camera having a plurality of connection terminals for connecting to a flash unit, including at least a first terminal for exchanging a first type of signal with said flash unit in a first mode of operation and exchanging a second type of signal with said flash unit in a second mode of operation, and a second terminal for determining the type of flash unit attached to said camera and for transmitting data between said camera and said flash unit only when said flash unit is of one type but not another type, said camera further including means responsive to the detection by said second terminal for switching said camera between said first and second modes of operation.

22. A camera suitable for use with different types of flash units, said camera having first terminal (X) for providing a trigger signal to a flash unit in both of first and second modes of operation, a second terminal (R) operable in said first mode of operation for receiving a flash ready signal from said flash unit indicating a flash ready condition and operable in a second mode of operation for transmitting a serial clock signal to said flash unit, a third terminal (Q) operable in said first and second modes for exchanging flash data signals and camera data signals with said flash unit and operable in said second mode for receiving said flash ready signal from said flash unit, a fourth terminal (C) for determining the type of flash unit attached to said camera, and an operation mode switching means responsive to the determination by said fourth terminal for switching said camera between said first and second modes of operation.

23. A flash device for camera, comprising:

coupling means, including at least one first terminal for exchange of signals between said flash device and said camera, for coupling said flash device to said camera;

operation mode switching means responsive to a control signal for switching the operation mode of said flash mechanism between first and second modes, and a control terminal other than said first terminal ffor providing said control signal to said operation mode switching means when said flash device is coupled to a predetermined type of camera.

24. A flash device according to claim 23, wherein said flash device is connectable to at least first and second types of cameras and operates in said first mode when connected to said first type of camera and in said second mode when connected to said second type of camera, with said control signal indicating tye type of camera to which said flash device is connected.

25. A flash device according to claim 24, wherein said operation mode switching means includes voltage control means for changing a voltage at said control terminal from a voltage applied thereto from said camera to a first predetermined value and for setting the voltage at said control terminal to a second predetermined value in the absence of a signal applied thereto from said camera, whereby a voltage of said first predetermined value at said control terminal indicates said second type of camera and a voltage of said second predetermined value at said control terminal indicates said first type of camera.

26. A flash device according to claim 25, wherein said voltage control means comprises a resistor connecting said control terminal to a reference potential.

27. A flash device according to claim 23, wherein said flash mechanism makes use of said first terminal but not said control terminal in said first mode and makes use of said first terminal and said control terminal in said second mode.

28. A flash device according to claim 23, wherein said coupling means comprises:

said first terminal ($X_0$) for receiving a trigger signal from said camera;

a second terminal ($R_0$) for providing a ready signal to said camera indicating that said flash device is ready for flashing in said first operating mode and for receiving a serial clock signal from said camera in said second mode of operation;

a third terminal ($Q_0$) for providing an aperture data signal to said camera and for receiving a quench signal from said camera during said first mode of operation and for exchanging said aperture data and quench signals with said camera and also exchanging a serial signal indicating a flash ready condition with said camera in said second mode of operation;

said control terminal ($C_0$); and a fifth terminal ($G_0$) providing a common ground for said first through fourth terminals.

29. A flash device for emitting flash photography light in a flashing mode of operation, said flash device comprising:

a data processing means for applying a flash data signal to a camera in an output mode and for receiving a camera data signal from said camera in an input mode, said data processing means being responsive to a quench signal received from said camera as said camera data signal for controlling the flash device to stop a flashing operation in said flashing mode; and control signal receiving means for receiving first, second and third pulse signals as control signals from said camera, said data processing means being responsive to said first pulse signal for switching said data processing means to said input mode, responsive to said second pulse signal for switching said data processing means to said output mode, and responsive to said third pulse signal for switching said data processing means to the flashing mode.

30. A flash device according to claim 29, wherein said data processing means is responsive to repetitive and alternating first and second pulse signals for repeating said input and output modes prior to the start of a flashing mode and is responsive to said third pulse signal at the beginning of a shutter release operation of said camera for switching to said flashing mode.

31. A flash device suitable for use with different types of cameras, said flash device having a plurality of connection terminals for connecting to a camera, including at least a first terminal for exchanging a first type of signal with said camera in a first mode of operation and exchanging a second type of signal with said camera in a second mode of operation, and a second terminal for determining the type of camea to which said flash device is attached, said flash device further including means responsive to the detection by said second terminal for switching said flash device between said first and second modes of operation.

32. A flash device suitable for use with different types of cameras, said flash device having first terminal ($X_0$) for receiving a trigger signal from a camera in both of first and second modes of operation, a second terminal ($R_0$) operable in said first mode of operation for providing a flash ready signal to said camera indicating a flash ready condition and operable in a second mode of operation for receiving a serial clock signal from said camera, a third terminal ($Q_0$) operable in said first and second modes for exchanging flash data signals and camera data signals with said camera and operable in said second mode for providing said flash ready signal to said camera, a fourth terminal ($C_0$) for determining the type of camera to which said flash device is attached, and operation mode switching means responsive to the determination by said fourth terminal for switching said flash device between said first and second modes of operation.

33. A power supply circuit for a flash device having at data exchange terminal means for providing signals to a camera in an output mode and for receiving signals from said camera in a input mode, and a control terminal for receiving a control signal from said camera for controlling the switching of said flash device between said input and output modes, said flash device further comprising power supply means connected to said control terminal and responsive to a change in a voltage level at said control terminal for supplying power to at least portions of said flash device.

34. A power supply circuit according to claim 33, wherein said power supply means sustains the supply of power to said at least portions of said flash device for a predetermined period of time after said change in voltage level at said control terminal.

35. A power supply circuit according to claim 33, wherein said power feeding means comprises a switching member (18) responsive to a control signal from the control terminal for switching from a first state to a second state, a power switch member (33) responsive to the second state of said switching member for turning ON, and a power supply sustaining means (28, 29, 32) responsive to an output from said switching member for sustaining the ON condition of said power switch member for said predetermined period.

36. A power supply circuit according to claim 33, wherein said power supply means provides power to all of said flash device.

37. A power supply circuit according to claim 33, wherein said power supply means provides power to only a portion of the circuits in said flash device.

* * * * *